(12) United States Patent
Fox et al.

(10) Patent No.: US 10,081,110 B2
(45) Date of Patent: *Sep. 25, 2018

(54) SELF-ALIGNING PIPE GRIPPING ASSEMBLY AND METHOD OF MAKING AND USING THE SAME

(71) Applicant: National Oilwell Varco, L.P., Houston, TX (US)

(72) Inventors: Preston R. Fox, Fountain Valley, CA (US); Neil E. West, Norco, CA (US); Lawrence E. Wells, Yorba Linda, CA (US)

(73) Assignee: National Oilwell Varco, L.P., Houston, TX (US)

(*) Notice: Subject to any disclaimer, the term of this patent is extended or adjusted under 35 U.S.C. 154(b) by 270 days.

This patent is subject to a terminal disclaimer.

(21) Appl. No.: 15/243,082

(22) Filed: Aug. 22, 2016

(65) Prior Publication Data

US 2016/0354934 A1 Dec. 8, 2016

Related U.S. Application Data

(63) Continuation of application No. 13/907,784, filed on May 31, 2013, now Pat. No. 9,452,535.

(51) Int. Cl.
| | | |
|---|---|---|
| *B25J 15/02* | (2006.01) | |
| *B25J 15/00* | (2006.01) | |
| *E21B 19/06* | (2006.01) | |
| *E21B 19/16* | (2006.01) | |

(52) U.S. Cl.
CPC ......... *B25J 15/0028* (2013.01); *E21B 19/06* (2013.01); *E21B 19/16* (2013.01)

(58) Field of Classification Search
CPC ...... B25J 15/0028; E21B 19/06; E21B 19/16; E21B 19/07; E21B 19/10
USPC ........ 294/192, 207, 102.1; 92/109, 172, 178
See application file for complete search history.

(56) References Cited

U.S. PATENT DOCUMENTS

| | | |
|---|---|---|
| 3,371,562 A | 3/1968 | Kelly |
| 3,507,174 A | 4/1970 | Dickmann |
| 3,548,692 A | 12/1970 | Dickmann |
| 4,401,000 A | 8/1983 | Kinzbach |
| 4,631,987 A | 12/1986 | Buck |
| 4,709,599 A | 12/1987 | Buck |
| 5,172,613 A | 12/1992 | Wesch |
| 5,566,769 A | 10/1996 | Stuart |
| 5,819,604 A | 10/1998 | Buck |
| 7,062,991 B1 | 6/2006 | West |

(Continued)

OTHER PUBLICATIONS

Extended European Search Report dated Dec. 4, 2015 in corresponding European Patent Application No. 14169281.4, (14 pgs.).

*Primary Examiner* — Gabriela M Puig
(74) *Attorney, Agent, or Firm* — Jonathan M. Pierce; Porter Hedges LLP

(57) ABSTRACT

A pipe gripping assembly to selectively engage and disengage a pipe segment includes first and second jaws configured to clamp together around the pipe segment, at least one splined shaft fixedly housed in each of the first and second jaws; and at least one self-aligning piston housed in each of the first and second jaws and configured to slide and to rotate along the splined shaft. The self-aligning pistons each include a piston body, a cam, and a roller assembly coupled to the piston body and to the splined shaft. Each one of the roller assembly is configured to rotate relative to one of the cams.

20 Claims, 18 Drawing Sheets

(56) References Cited

U.S. PATENT DOCUMENTS

| | | |
|---|---|---|
| 7,188,547 B1 | 3/2007 | West |
| 7,510,006 B2 | 3/2009 | Juhasz |
| 2005/0076744 A1 | 4/2005 | Pietras |
| 2006/0081091 A1 | 4/2006 | Wesch |
| 2013/0228071 A1 | 9/2013 | Nagel |
| 2014/0298988 A1 | 10/2014 | Smith |

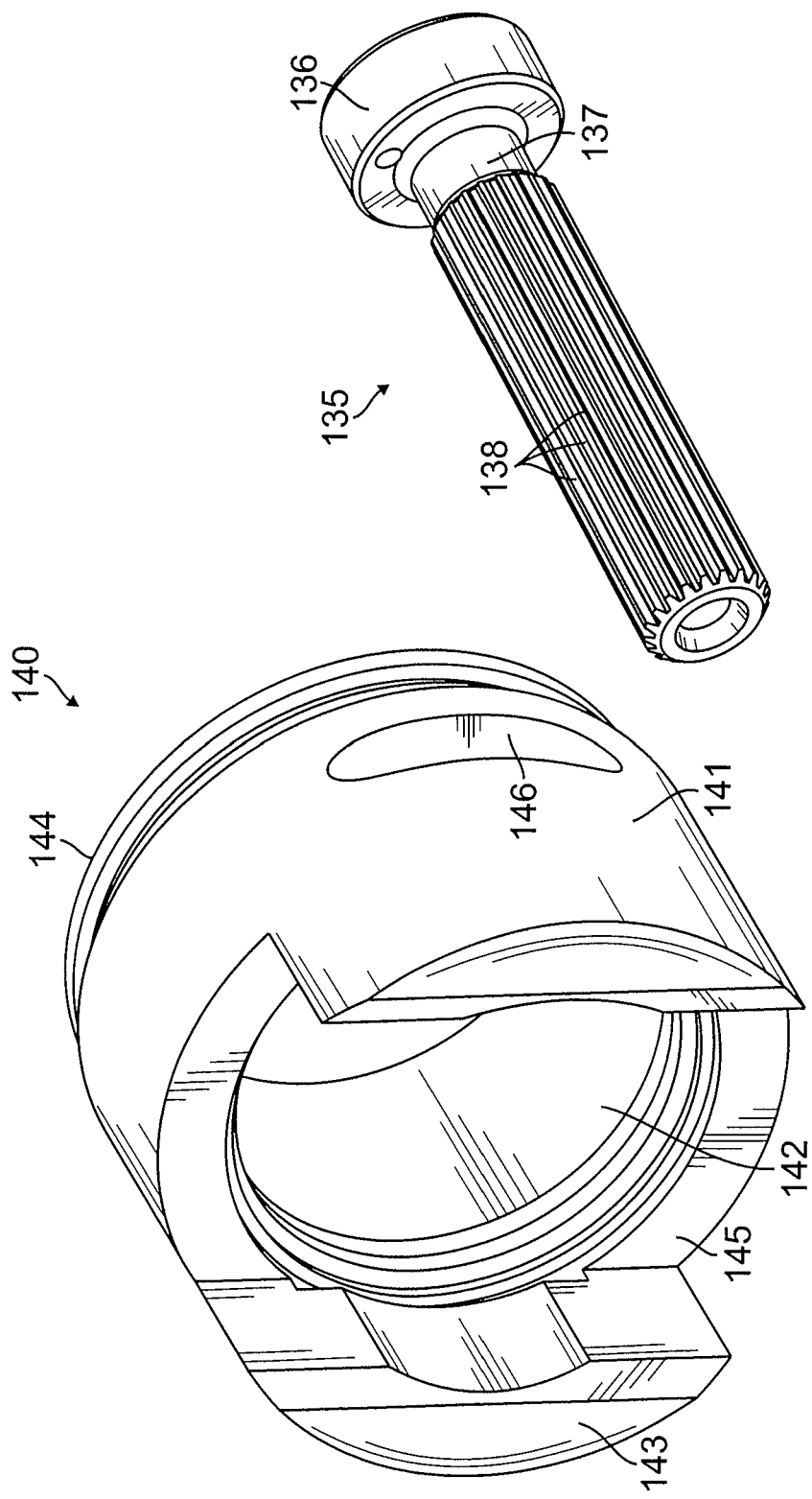

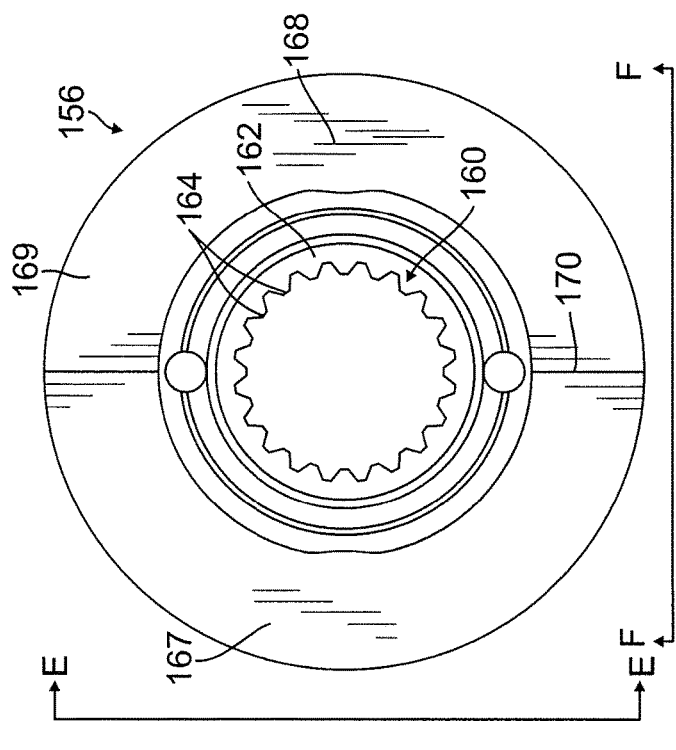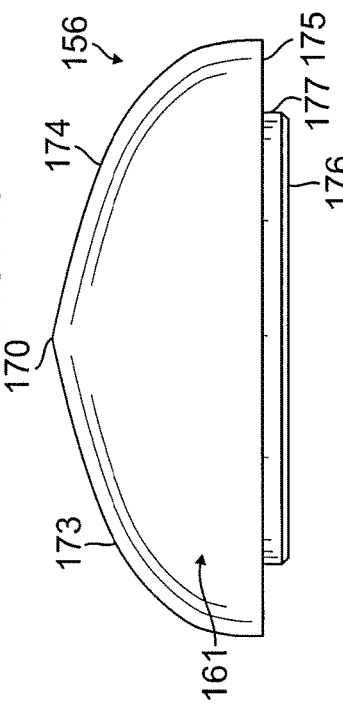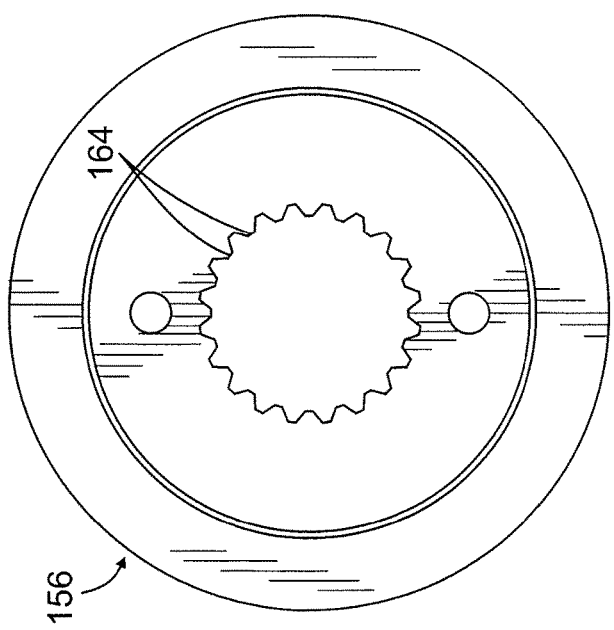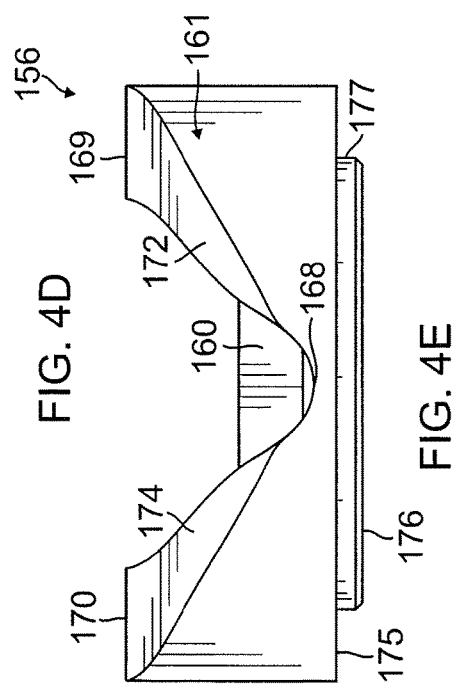

SELF-ALIGNING PIPE GRIPPING ASSEMBLY AND METHOD OF MAKING AND USING THE SAME

CROSS-REFERENCE TO RELATED APPLICATIONS

This application is a continuation of, and claims priority to, U.S. application Ser. No. 13/907,784 filed on May 31, 2013, which is incorporated herein by reference.

BACKGROUND

The present disclosure relates generally to pipe gripping assemblies, and more particularly to self-aligning pipe gripping pistons.

The process of drilling an oil well typically involves assembling drill strings and casing strings and inserting the drill strings and casing strings into the ground to form a well bore. The drill strings and casing strings extend downward from an oil drilling rig and into the ground. The drilling strings and the casing strings are rotationally driven into the ground by a top drive motor on the drilling rig. Drill strings typically include a series of drill segments that are threaded together. The lowest drill segment (i.e., the drill segment extending the furthest into the ground) includes a drill bit at its lower end. Typically, the casing string is provided around the drill string to line the well bore after the drilling operation has been completed. The casing string is configured to ensure the integrity of the well bore. The casing string includes a series of casing segments that are threaded together.

Recently, pipe gripping devices have been devised that utilize the existing top drive of the oil drilling rig to assemble the drill strings and the casing strings. Some conventional pipe gripping devices are fixedly mounted in a robust support. When such conventional gripping devices are subject to a large off-center force during operation, however, the conventional gripping device may become damaged, which is both costly and time consuming as the drilling operation must cease in order to repair the damaged pipe gripping device.

BRIEF SUMMARY OF THE DISCLOSURE

The disclosure describes self-aligning pistons configured to selectively engage and disengage a pipe segment. The self-aligning pistons comprise a shaft, a piston body, and a cam and roller assembly coupled between the shaft and the piston body. The cam and roller assembly includes a cam and a plurality of rollers. The piston body is configured to slide along the shaft between an engaged position with the pipe segment and a disengaged position. The piston body is also configured to rotate around the shaft between an aligned orientation relative to the pipe segment and a misaligned orientation.

The self-aligning pistons may further comprise a resilient, energy-storing member coupled to the piston body. The resilient, energy-storing member may be configured to press the plurality of rollers against the cam. The resilient, energy-storing member comprises a plurality of springs. The resilient, energy-storing member may be in a pre-compressed state when the piston body is in the engaged position.

The shaft may be splined. The cam may further comprise a hub having a splined surface configured to engage the shaft, the engagement between the hub and the shaft being configured to prevent the rotation of the cam about the shaft.

The cam may define a contoured cam surface having wells and apices; and the plurality of rollers rest in the wells.

The self-aligning pistons may further comprise a die assembly coupled to the piston body.

The disclosure also describes self-aligning pistons self-aligning piston assemblies configured to selectively engage and disengage a pipe segment. The self-aligning piston assembly comprise a splined shaft, and a piston assembly configured to slide along the splined shaft between an engaged position and a disengaged position. The piston assembly includes a piston housing configured to rotate between an aligned position and a misaligned position relative to the pipe segment, a plurality of springs coupled to the piston housing, a cam defining a cam surface having wells and apices, and a roller assembly, the roller assembly including a plurality of rollers configured to roll along the cam surface. The plurality of rollers are configured to rest in the wells when the piston housing is in the aligned position. The plurality of rollers are configured to roll along the cam surface toward the apices as the piston housing is rotated into the misaligned position. The springs are configured to bias the rollers into the wells to return the piston housing to the aligned position.

The cam may further comprise a hub having a splined surface configured to engage the splined shaft. The engagement between the hub and the splined shaft may be configured to prevent rotation of the cam about the splined shaft.

The self-aligning piston assemblies may further comprise a die assembly coupled to the piston housing. The die assembly may comprise a die holder and a die insert configured to be supported by the die holder.

The piston housing may comprise a plurality of smooth blind bores configured to receive the plurality of springs.

The self-aligning piston assemblies may further comprise a thrust bearing disposed between the cam and the plurality of springs.

The disclosure also describes pipe gripping assemblies configured to selectively engage and disengage a pipe segment. The pipe gripping assemblies include first and second jaws configured to clamp together around the pipe segment. At least one of the first and second jaws comprises a splined shaft fixedly housed in the at least one of the first and second jaws, and a self-aligning piston housed in the at least one of the first and second jaws and configured to slide along the splined shaft between an engaged position and a disengaged position and to rotate around the splined shaft between an aligned orientation relative to the pipe segment and a misaligned orientation. The self-aligning pistons includes a piston body and a cam and roller assembly coupled to the piston body and to the splined shaft. The cam and roller assembly includes a cam and a plurality of rollers configured to rotate relative to the cam.

The at least one of the first and second jaws may further comprise an extension port configured to receive pressurized hydraulic fluid to actuate the self-aligning piston into the engaged position, and a retraction port configured to receive pressurized hydraulic fluid to actuate the self-aligning piston into the disengaged position.

The pipe gripping assemblies may further comprise a gland fixedly housed in the at least one the first and second jaws. The gland may be configured to create a fluid-tight seal around the self-aligning piston.

The cam may define a contoured cam surface having wells and apices. The plurality of rollers may be configured to rest in the wells when the self-aligning piston is in the aligned orientation. The plurality of rollers may be configured to roll along the contoured cam surface toward the apices as the self-aligning piston is rotated toward the misaligned orientation. A resilient, energy-storing member may be configured to bias the plurality of rollers into the wells to return the self-aligning piston to the aligned orientation.

The cam may further comprise a hub having a splined surface configured to engage the splined shaft. The engagement between the hub and the splined shaft may be configured to prevent the rotation of the cam about the splined shaft.

The pipe gripping assemblies may further comprise a die assembly coupled to an inner end of the piston body.

The self-aligning piston may further comprise an energy-storing member coupled to the piston body. The energy-storing member may be in a pre-compressed state when the self-aligning piston is in the engaged position. The energy-storing member may be compressed further into a higher potential energy state when the self-aligning piston is in the disengaged position.

BRIEF DESCRIPTION OF THE DRAWINGS

These and other features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

FIGS. 2C and 2D are front perspective views of a gland and a splined shaft, respectively, according to one embodiment of the present disclosure;

FIGS. 4C and 4D are rear and front plan views, respectively, of the cam illustrated in FIGS. 4A and 4B;

FIGS. 4E and 4F are a side view and a top view, respectively, of the cam illustrated in FIGS. 4A-4D;

DETAILED DESCRIPTION

The present disclosure is directed to pipe gripping assemblies and self-aligning piston assemblies for use in oil well drilling systems to connect and disconnect pipe segments to a pipe string extending downwardly into a well bore. As used herein, the term "pipe segment" refers to casing segments and/or drill segments, and the term "pipe string" refers to casing strings and/or drill strings. The self-aligning piston assemblies of the present disclosure are configured to engage a pipe segment such that an output shaft of an existing top drive may be threaded onto the pipe segment. (i.e., the self-aligning piston assemblies fix the pipe segment such that the output shaft of the top drive may rotate relative to the pipe segment to connect the output shaft to the pipe segment).

Additionally, in response to an off-center load, the self-aligning piston assemblies of the present disclosure are configured to rotate out of alignment with the pipe segment in order to mitigate stresses on the self-aligning piston assemblies (i.e., the self-aligning piston assemblies are configured to rotate out of alignment for survivability). However, such misalignment between the self-aligning piston assemblies and the pipe segment reduces the efficacy of the pipe gripping assemblies and poses a risk of damaging the pipe segment through mishandling. Accordingly, the self-aligning piston assemblies of the present disclosure are also configured to correct for the undesirable rotational misalignment between the self-aligning piston assemblies and the pipe segments without requiring manual realignment of the various components of the self-aligning piston assemblies. Thus, the self-aligning piston assemblies of the present disclosure are configured to permit rotation of the self-aligning piston assemblies out of alignment with the pipe segment to mitigate stresses on the self-aligning piston assemblies and to then automatically return the self-aligning piston assemblies to their aligned orientation relative to the pipe segment.

Figure 1:
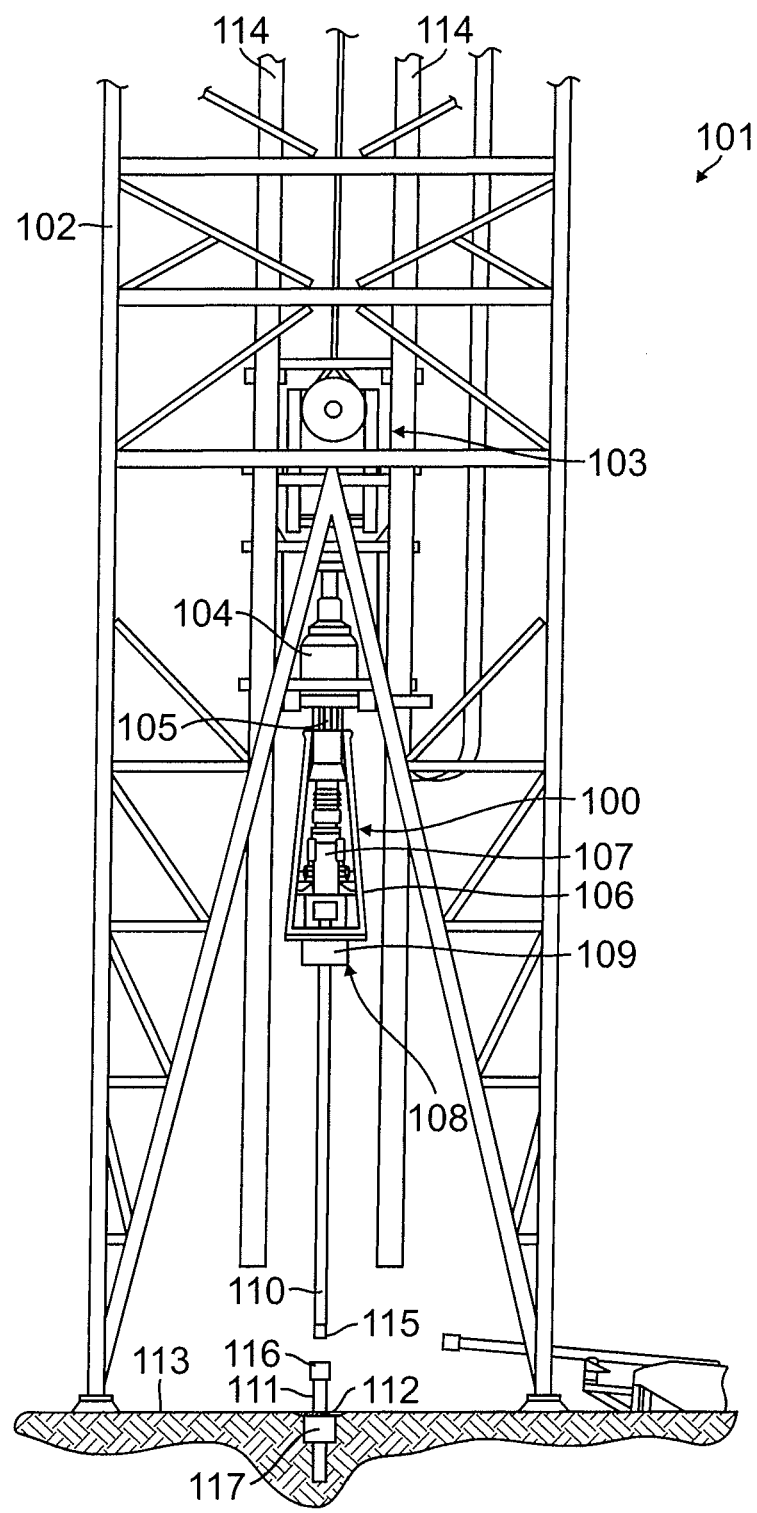
FIG. 1 is a side elevational view of a drilling rig incorporating a pipe gripping assembly according to one embodiment of the present disclosure.

The pipe gripping assemblies and self-aligning piston assemblies of the present disclosure may be incorporated into any suitable existing pipe running tool. A suitable pipe running tool is described in U.S. Pat. No. 7,510,006, the entire contents of which are hereby incorporated by reference. A pipe running tool 100 designed for use in a well drilling rig 101 is illustrated in FIG. 1. The well drilling rig 101 includes a frame assembly 102 and a top drive assembly 103. The top drive assembly 103 includes a top drive motor 104 and a top drive output shaft 105 extending downwardly from the top drive motor 104. The pipe running tool 100 includes a frame assembly 106, a rotatable shaft 107, and a pipe engagement assembly 108 coupled to the rotatable shaft 107. The rotatable shaft 107 of the pipe running tool 100 is rotatably coupled to the top drive output shaft 105 such that when the top drive output shaft 105 is rotated by the top drive motor 104, the rotatable shaft 107 of the pipe running tool 100 is synchronously rotated. The pipe engagement assembly 108 of the pipe running tool 100 includes a spider/elevator 109 configured to selectively engage a pipe segment 110 to enable the well drilling rig 101 to create a threaded connection between the top drive output shaft 105 and the pipe segment 110 and subsequently a threaded connection between the pipe segment 110 and a pipe string 111.

In order to create a threaded connection between the pipe segment 110 and the pipe string 111, the pipe segment 110 is first hoisted upwardly until the upper end of the pipe segment 110 extends through the spider/elevator 109. The spider/elevator 109 is then actuated into an engaged position to positively engage the pipe segment 110. The engagement between the spider/elevator 109 and the pipe segment 110 prevents relative rotation between the pipe segment 110 and the spider/elevator 109. The top drive motor 104 is then actuated to rotate the top drive output shaft 105, which in turn creates a threaded connection between the top drive output shaft 105 and the pipe segment 110 via the rotatable shaft 107. Once the top drive output shaft 105 is coupled to the pipe segment 110, the spider/elevator 109 may be actuated into a disengaged position to release the pipe segment 110 such that the pipe segment 110 may rotate synchronously with the rotation of the top drive output shaft 105.

The top drive assembly 103 is then lowered relative to the frame assembly 102 along a pair of guide rails 114 to drive a threaded lower end 115 of the pipe segment 110 into contact with a threaded upper end 116 of the pipe string 111. As illustrated in FIG. 1, the pipe string 111 extends down into the well bore through a flush-mounted spider 117 mounted in a central opening 112 in the drill floor 113. During the process of coupling the pipe segment 110 to the pipe string 111, the flush-mounted spider 117 is actuated to engage the pipe string 111 to prevent relative rotation of the pipe string 111 with respect to the flush-mounted spider 117. The top drive motor 104 is then actuated to rotate the top drive output shaft 105, which in turn rotates the rotatable shaft 107 of the pipe running tool 100 and the pipe segment 110. The pipe segment 110 is thus rotated into threaded engagement with the pipe string 111. It will be appreciated that the well drilling rig 101 and the pipe running tool 100 are also configured to decouple (i.e., breakout) the pipe segment 110 from the pipe string 111. The pipe gripping assemblies and self-aligning piston assemblies of the present disclosure may be integrated into the spider/elevator 109 of the pipe running tool 100 or any other suitable structure.

Figure 2A:
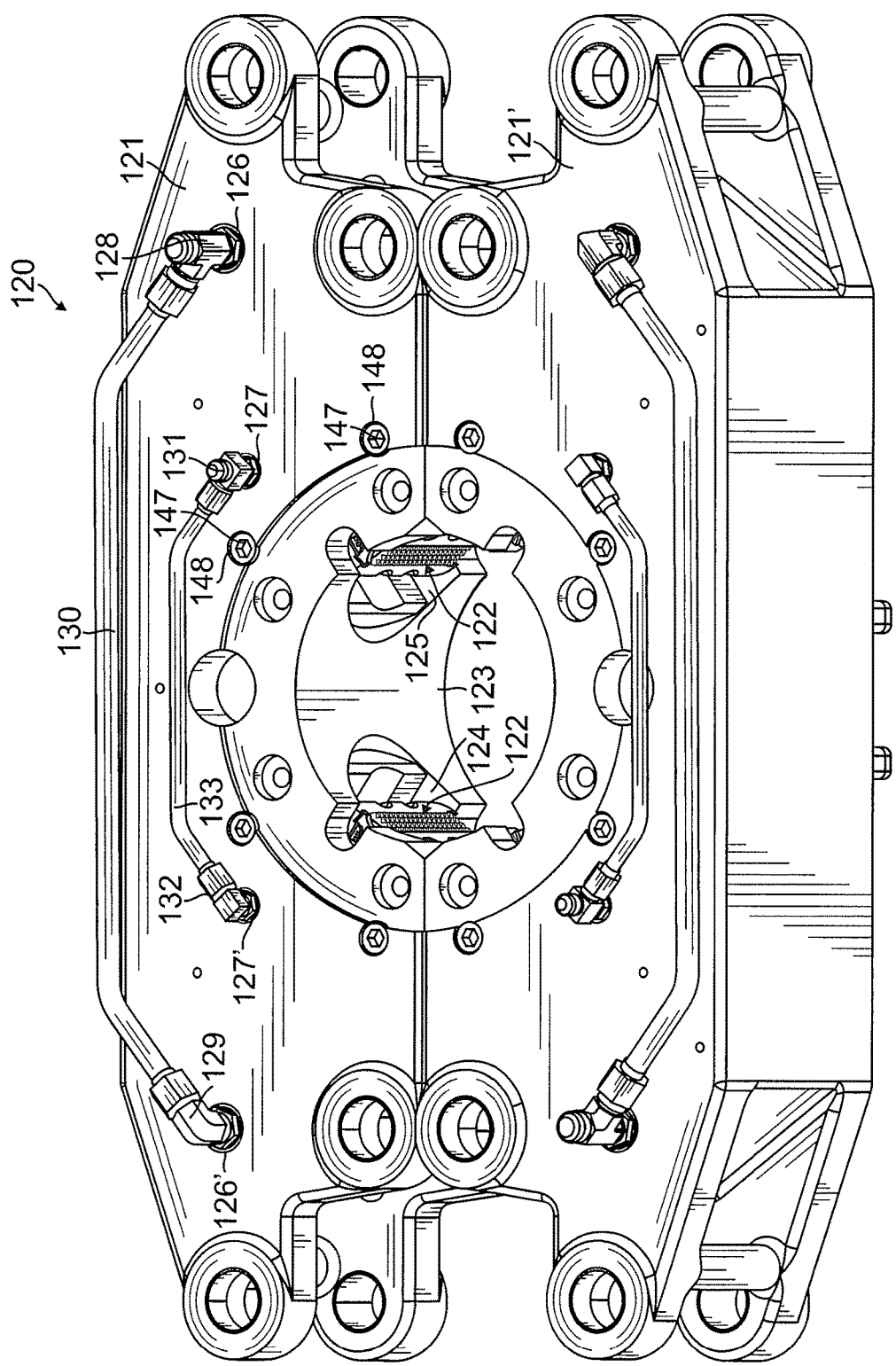
FIG. 2A is a perspective view of a pipe gripping assembly including a jaw housing two self-aligning piston assemblies according to one embodiment of the present disclosure.
Figure 2B:
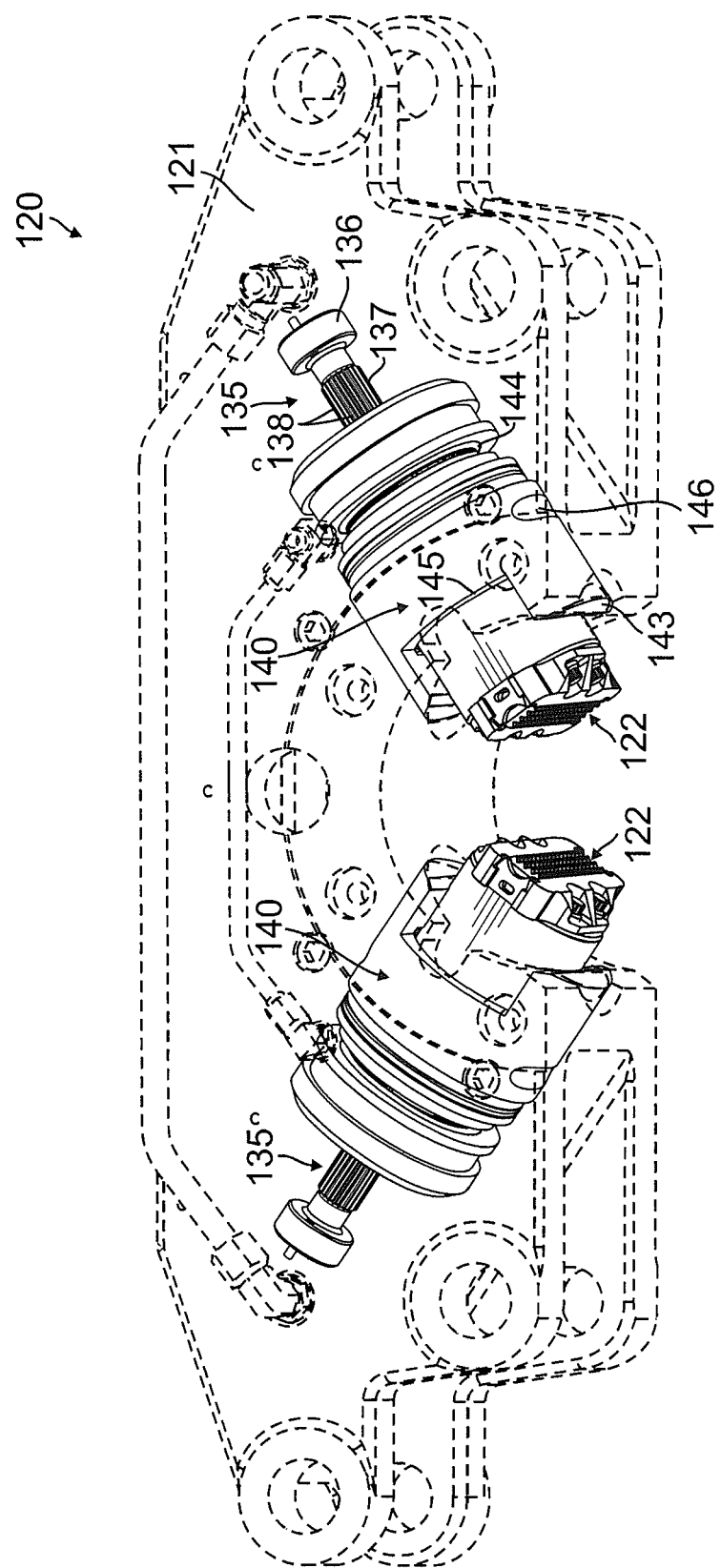
FIG. 2B is a perspective view of the embodiment of the pipe gripping assembly illustrated in FIG. 2A with the jaw shown in phantom.

With reference now to the embodiment illustrated in FIGS. 2A and 2B, the pipe gripping assembly 120 includes a pair of jaws 121, 121' configured to clamp together around the pipe segment 110. In one embodiment, both jaws 121, 121' are similar or identical such that the reference number designations used for the constituent parts and/or features of one of the jaws 121 applies equally to the constituent parts and/or features of the other jaw 121'. In the illustrated embodiment, each jaw 121, 121' houses two self-aligning piston assemblies 122 arranged in a v-shaped configuration (i.e., the self-aligning piston assemblies 122 are arranged radially in the jaws 121, 121'). Together, the self-aligning piston assemblies 122 in the pair of jaws 121, 121' are arranged in an x-shaped configuration (i.e., each self-aligning piston assembly 122 in one of the jaws 121 corresponds to a diametrically opposed self-aligning piston assembly 122 in the other jaw 121'). It will be appreciated, however, that each jaw 121, 121' may house any other suitable number of self-aligning piston assemblies 122, such as, for example, one to four, and still fall within the scope and spirit of the present disclosure. Additionally, the self-aligning piston assemblies 122 may be arranged in any other suitable configuration in the jaws 121, 121', such as, for example, an inline configuration, and still fall within the scope and spirit of the present disclosure.

With continued reference to the embodiment illustrated in FIGS. 2A and 2B, each jaw 121, 121' includes a semi-annular notch 123 and two apertures 124, 125 (e.g., smooth cylindrical blind bores) extending radially outward from the semi-annular notch 123. When the jaws 121, 121' are clamped together around the pipe segment 110, the semi-annular notches 123 define a circular opening through which the pipe segment 110 passes. As illustrated in FIGS. 2A and 2B, the apertures 124, 125 are configured to house the two self-aligning piston assemblies 122.

The self-aligning piston assemblies 122 are configured to be actuated between an engaged position and a disengaged position such that the pipe gripping assembly 120 may selectively engage and disengage the pipe segment 110. When the self-aligning piston assemblies 122 are actuated into the engaged position, the self-aligning piston assemblies 122 protrude inward from the semi-annular notches 123 in the jaws 121, 121'. In contrast, when the self-aligning piston assemblies 122 are actuated into the disengaged position, the piston assemblies 122 are retracted into apertures 124, 125 in the jaws 121, 121' such that the self-aligning piston assemblies 122 do not protrude inward beyond the semi-annular notches 123 in the jaws 121, 121'. The self-aligning piston assemblies 122 are illustrated in a retracted, disengaged position in FIG. 2A and in an extended, engaged position in FIG. 2B.

In the extended position, the self-aligning piston assemblies 122 are configured to positively engage the pipe segment 110 to prevent relative rotation between the pipe segment 110 and the pipe gripping assembly 120. Accordingly, the top drive output shaft 105 may be threaded into engagement with the pipe segment 110 by actuating the top drive motor 104. It will be appreciated that the positive engagement between the self-aligning piston assemblies 122 and the pipe segment 110 also enables the well drilling rig 101 to decouple the pipe segment 110 from the top drive output shaft 105. In the retracted position, the self-aligning piston assemblies 122 are disengaged from the pipe segment 110 in order to permit the pipe segment 110 to rotate synchronously with the top drive output shaft 105. Accordingly, when the self-aligning piston assemblies 122 are disengaged from the pipe segment 110, the top drive motor 104 may create a threaded connection between the pipe segment 110 and the pipe string 111 (i.e., the top drive motor 104 may be actuated to rotate the top drive output shaft 105, which in turn threads the pipe segment 110 into engagement with the pipe string 111, which is held in place by the flush-mounted spider 117 or other suitable structure).

The self-aligning piston assemblies 122 may be actuated between the engaged and disengaged positions by any suitable means, such as, for example, a pneumatic motor, an electric motor, a hydraulic motor, or any combination thereof In the embodiment illustrated in FIGS. 2A and 2B, the self-aligning piston assemblies 122 are configured to be actuated by a hydraulic motor. Each jaw 121, 121' includes at least one extension port 126 and at least one retraction port 127. In the illustrated embodiment, the number of extension ports 126 and the number of retraction ports 127 corresponds to the number of self-aligning piston assemblies 122 housed in each jaw 121, 121' (i.e., each jaw 121, 121' houses two self-aligning piston assemblies 122 and includes two extension ports 126, 126' and two retraction ports 127, 127'). Extension and retraction ports 126, 127 are configured to actuate one of the self-aligning piston assemblies 122 between the engaged and disengaged positions, and extension and retraction ports 126, 127' are configured to actuate the other self-aligning piston assembly 122 between the engaged and disengaged positions. It will be appreciated, however, that the number of extension ports 126 and the number of retraction ports 127 may differ from the number of piston assemblies 122. In one embodiment, for example, each jaw 121, 121' may house two self-aligning piston assemblies 122 and may have a single extension port 126 and a single retraction port 127.

The extension ports 126, 126' are configured to be coupled to a hydraulic system delivering pressurized hydraulic fluid to actuate the self-aligning piston assemblies 122 into the engaged, extended position, as shown in FIG. 2B. The retraction ports 127, 127' are configured to be coupled to a hydraulic system delivering pressurized hydraulic fluid to actuate the self-aligning piston assemblies 122 into the disengaged, retracted position, as shown in FIG. 2A. In the illustrated embodiment, the pipe gripping assembly 120 includes a t-joint 128 coupled to one of the extension ports 126, an elbow joint 129 coupled to the other extension port 126', and a hydraulic line 130 extending between the t-joint 128 and the elbow joint 129. Pressurized hydraulic fluid is configured to flow into the t-joint 128 and the t-joint 128 is configured to split the flow of pressurized hydraulic fluid equally between the two extension ports 126, 126'. Similarly, in the illustrated embodiment, the pipe gripping 100 assembly includes a t-joint 131 coupled to one of the retraction ports 127, an elbow joint 132 coupled to the other retraction port 127', and a hydraulic line 133 extending between the t-joint 131 and the elbow joint 132. Pressurized hydraulic fluid is configured to flow into the t-joint 131 and the t-joint 131 is configured to split the flow of pressurized hydraulic fluid equally between the two retraction ports 127, 127'.

With continued reference to FIGS. 2A and 2B, each of the self-aligning piston assemblies 122 is configured to slide along a shaft 135 as the self-aligning piston assemblies 122 are actuated between the engaged position (FIG. 2B) and the disengaged position (FIG. 2A). The shafts 135 are fixedly housed in the apertures 124, 125 in the jaw 121, 121'. In the illustrated embodiment of FIGS. 2B and 2D, each shaft 135 includes a cylindrical body portion 136 and an elongated cylindrical rod 137 projecting inward from the cylindrical body portion 136. At least a portion of the elongated cylindrical rod 137 is splined (i.e., the shaft 135 includes a series of notches or grooves 138 extending lengthwise along the elongated cylindrical rod 137 and circumferentially disposed around the elongated cylindrical rod 137). As described in further detail below, the splined shafts 135 are configured to restrict rotation of some of the components of the self-aligning piston assemblies 122 and permit rotation of some other components of the self-aligning piston assemblies 122 in order to self-align the piston assemblies 122 with the pipe segment 110.

Still referring to FIG. 2B, each of the self-aligning piston assemblies 122 is slidably received in a gland 140. The glands 140 are configured to create a fluid-tight seal around the self-aligning piston assemblies 122 (e.g., the glands 140 are configured to prevent hydraulic fluid from leaking out of the pipe gripping assembly 120). The glands 140 are fixedly housed in the apertures 124, 125 in the jaws 121, 121'. In one embodiment, the glands 140 are press-fit or friction fit into the apertures 124, 125 in the jaws 121, 121'. As illustrated in FIG. 2C, each gland 140 includes a cylindrical outer surface 141 and a central opening 142 (e.g., a smooth cylindrical bore) extending between inner and outer ends 143, 144, respectively, of the gland 140. The central openings 142 in the glands 140 are configured to slidable receive the self-aligning piston assemblies 122 (i.e., the self-aligning piston assemblies 122 slide in the central openings 142 of the glands 140 as the self-aligning piston assemblies 122 are actuated between the engaged and disengaged positions). Each gland 140 also includes a rectangular recess 145 extending outward from the inner end 143. When the self-aligning piston assemblies 122 are in the retracted, disengaged position (see FIG. 2A), die assemblies, described in detail below, are received in the rectangular recesses 145 in the glands 140. When the self-aligning piston assemblies 122 are in the extended, engaged position (see FIG. 2B), the die assemblies extend out of the rectangular recesses 145 and beyond the inner ends 143 of the glands 140. In the illustrated embodiment, the outer cylindrical surface 141 of each gland 140 also includes a pair of opposing arcuate notches (only one notch 146 is visible in FIG. 2C). When the glands 140 are received in the apertures 124, 125 in the jaws 121, 121', as illustrated in FIGS. 2A and 2B, pins 147 are configured to extend down through openings 148 in the jaws 121, 121' and into the arcuate notches 146 to fixedly attach the glands 140 to the jaws 121, 121'.

Figure 3A:
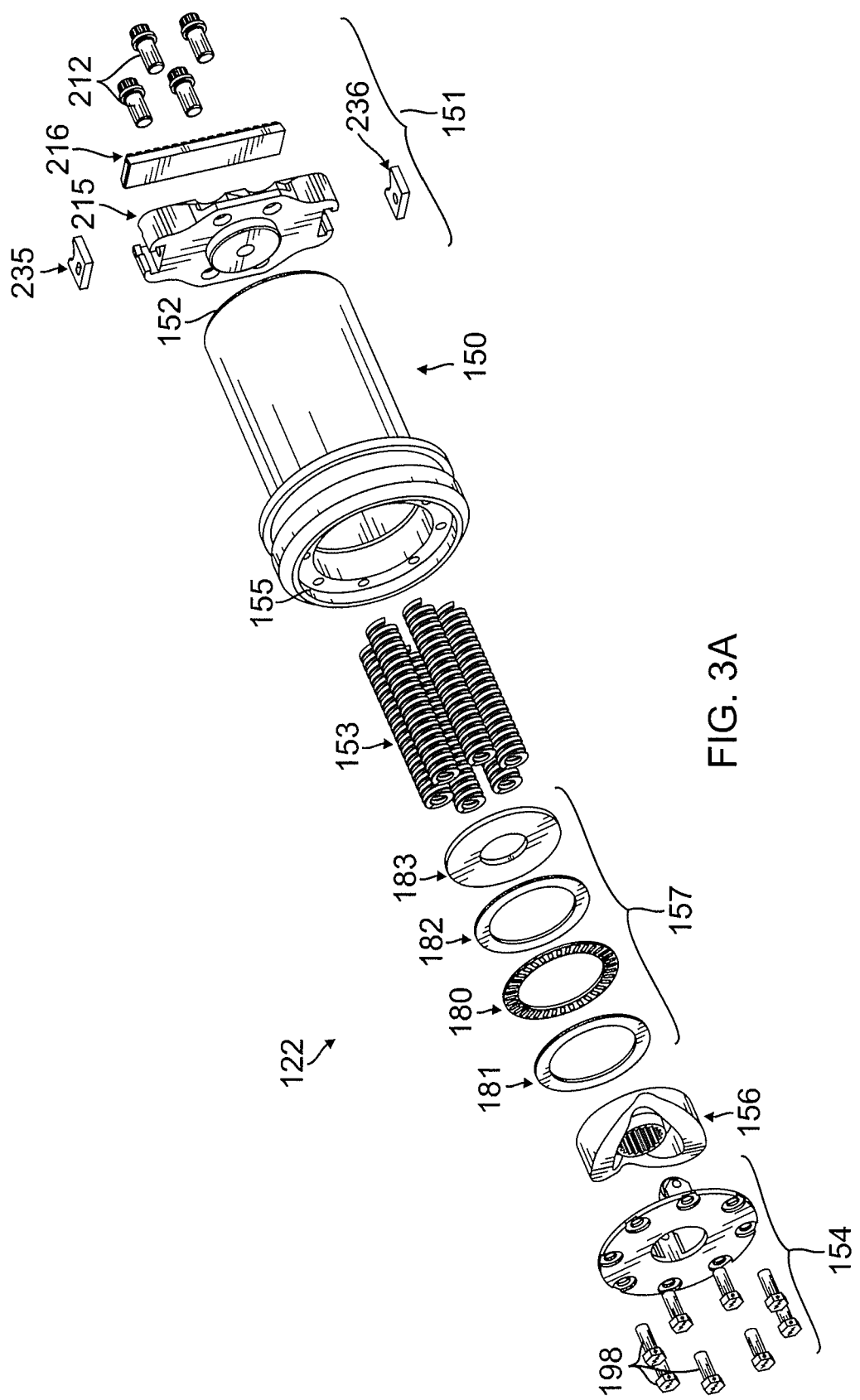
FIGS. 3A and 3B are exploded rear and front perspective views, respectively, of one of the self-aligning piston assemblies illustrated in FIGS. 2A and 2B.
Figure 3B:
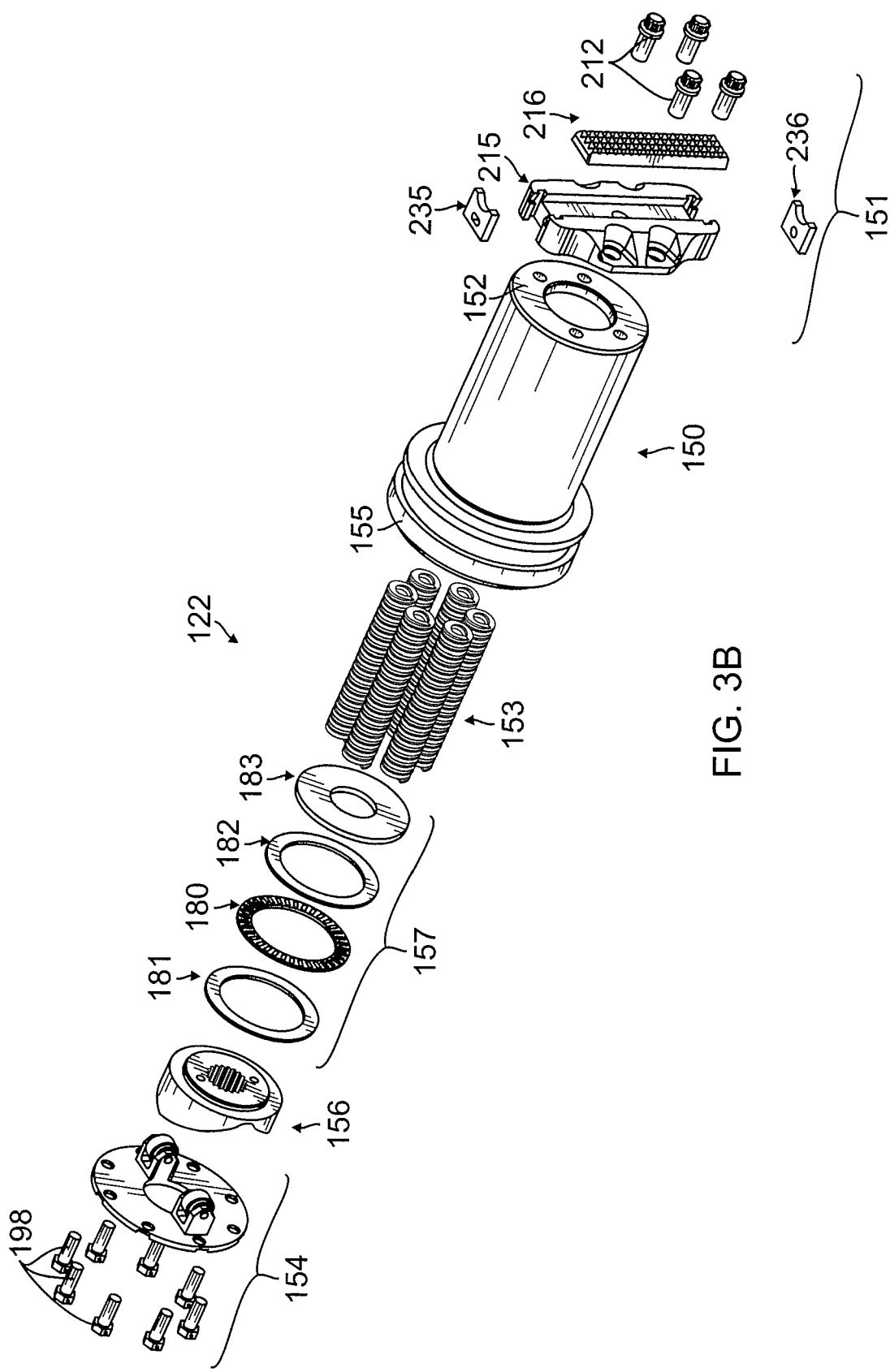
Figure 4A:
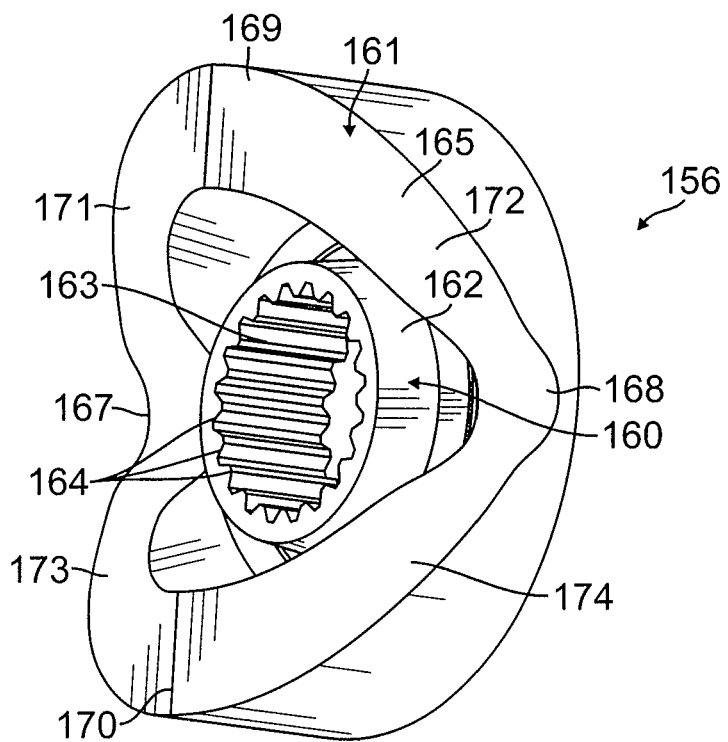
FIGS. 4A and 4B are rear and front perspective views, respectively, of a cam according to one embodiment of the present disclosure.
Figure 4B:
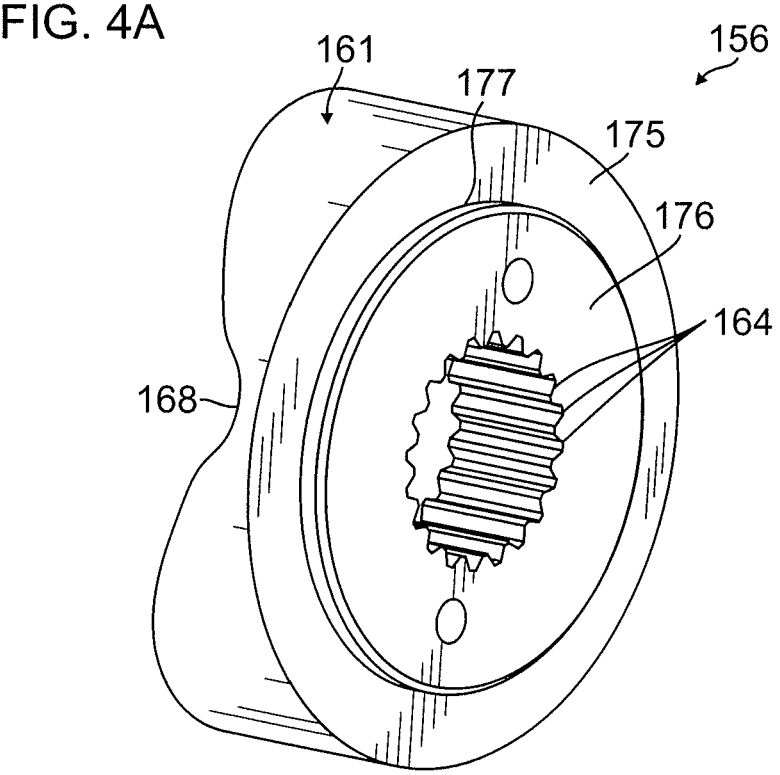

With reference now to the embodiment illustrated in FIGS. 3A and 3B, each self-aligning piston assembly 122 includes a piston body 150, a die assembly 151 configured to be coupled to an inner end 152 of the piston body 150, a plurality of springs 153 configured to be housed in the piston body 150, a roller assembly 154 configured to be coupled to an outer end 155 of the piston body 150, a cam 156 disposed between the springs 153 and the roller assembly 154, and a thrust bearing assembly 157 disposed between the cam 156 and the springs 153.

With reference now to the embodiment illustrated in FIGS. 4A-4F, the cam 156 includes a central hub 160 and a rim 161 surrounding the hub 160. In the illustrated embodiment, the hub 160 is a thin-walled cylindrical protrusion having a smooth outer surface 162 and a splined inner surface 163 having a plurality of ridges or teeth 164 (i.e., the cam 156 includes a plurality of ridges or teeth 164 extending lengthwise along the inner surface 163 of the hub 160 and circumferentially disposed around the inner surface 163 of the hub 160). The splined inner surface 163 of the hub 160 is configured to engage the splined shaft 135 (i.e., the teeth 164 on the cam 156 are configured to mesh with the grooves 138 in the splined shaft 135). The engagement between the teeth 164 on the cam 156 and the grooves 138 in the shaft 135 is configured to prevent the cam 156 from rotating around the shaft 135 but permit the cam 156 to slide axially along the shaft 135, the significance of which is described below (i.e., the splined cam 156 remains rotationally fixed relative to the splined shaft 135, but is configured to be translated axially along the splined shaft 135).

With continued reference to FIGS. 4A-4F, the rim 161 of the cam 156 defines a pathway or cam surface 165 along which rollers 166 on the roller assembly 154 are configured to roll as the die assembly 151 on the self-aligning piston assembly 122 is rotating into and out of alignment with the pipe segment 110. In the illustrated embodiment, the cam surface 165 includes opposing first and second recesses or wells 167, 168 and opposing first and second peaks or apices 169, 170 (i.e., the first and second wells 167, 168 are diametrically opposed from each other on the rim 161, and the first and second apices 169, 170 are diametrically opposed from each other on the rim 161). Additionally, in the illustrated embodiment, the apices 169, 170 in the cam surface 165 are radially spaced apart from the wells 167, 168 by approximately 90 degrees. The cam surface 165 also includes four sloped surface segments 171, 172, 173, 174 extending between adjacent wells 167, 168 and apices 169, 170. As described in further detail below, the contoured cam surface 165 is configured to convert the rotary motion of the die assembly 151 (i.e., as the die assembly 151 on the self-aligning piston assembly 122 is rotating into and out of alignment with the pipe segment 110) into reciprocating linear motion of the cam 156 along the axis of the splined shaft 135.

With continued reference to FIGS. 4B, 4C, 4E, and 4F, the cam 156 also includes an annular recess 175 extending outward from an inner end 176 of the cam 156. The annular recess 175 extends around the periphery of the rim 161. The annular recess 175 also defines an annular lip 177. The annular recess 175 is configured to receive the bearing assembly 157. In the illustrated embodiment of FIGS. 2A and 2B, the thrust bearing assembly 157 includes a thrust bearing 180, a thrust washer 181 disposed on an outer end of the thrust bearing 180, and a pair of thrust washers 182, 183 disposed on an inner end of the thrust bearing 180. The thrust bearing 180 may be any suitable type of thrust bearing, such as, for example, a cylindrical roller thrust bearing or a thrust ball bearing. The annular lip 177 on the cam 156 is configured to support inner diameters of the thrust bearing 180 and two of the thrust washers 181, 182 disposed on opposite sides of the thrust bearing 180.

With reference now to the embodiment illustrated in FIGS. 5A-5D, the roller plate assembly 154 includes a flat, circular plate 185 having an inner surface 186 and an outer surface 187 opposite the inner surface 186, and a central opening 188, such as a smooth circular through hole, extending between the inner and outer surfaces 186, 187. The central opening 188 in the roller plate assembly 154 is configured to receive the splined shaft 135 (i.e., the inner diameter of the central opening 188 in the circular plate 185 is larger than the outer diameter of the elongated cylindrical rod 137 on the splined shaft 135 such that the elongated cylindrical rod 137 may extend through the central opening 188). The central opening 188 in the circular plate 185 is configured to allow the roller plate assembly 154 to both rotate around the splined shaft 135 and slide axially along the splined shaft 135, the significance of which is described below.

Figure 5A:
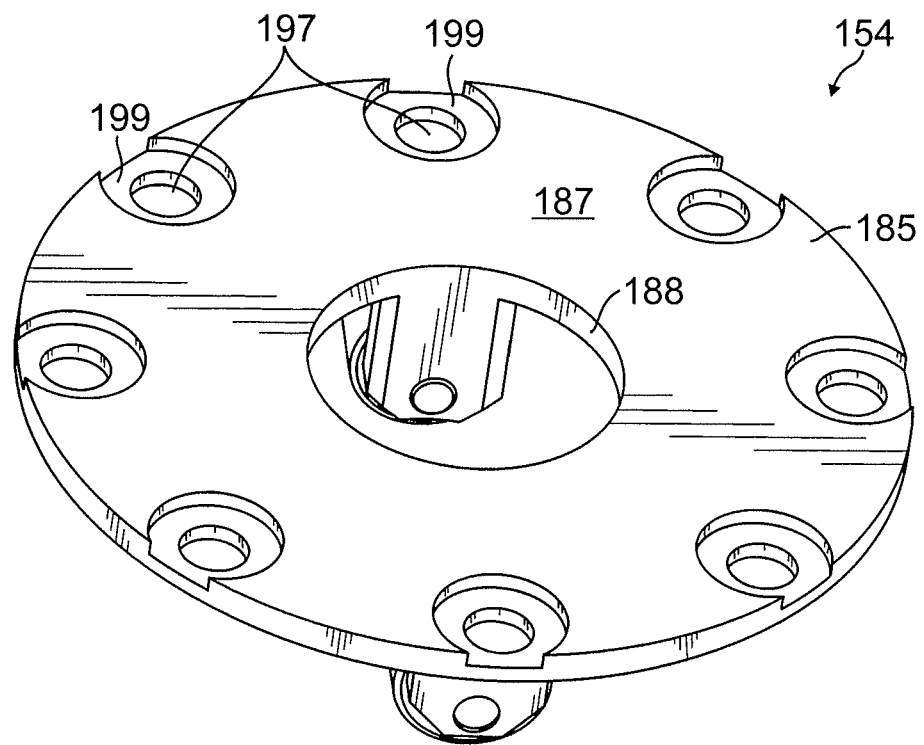
FIGS. 5A and 5B are rear and front perspective views, respectively, of a roller assembly according to one embodiment of the present disclosure.
Figure 5B:
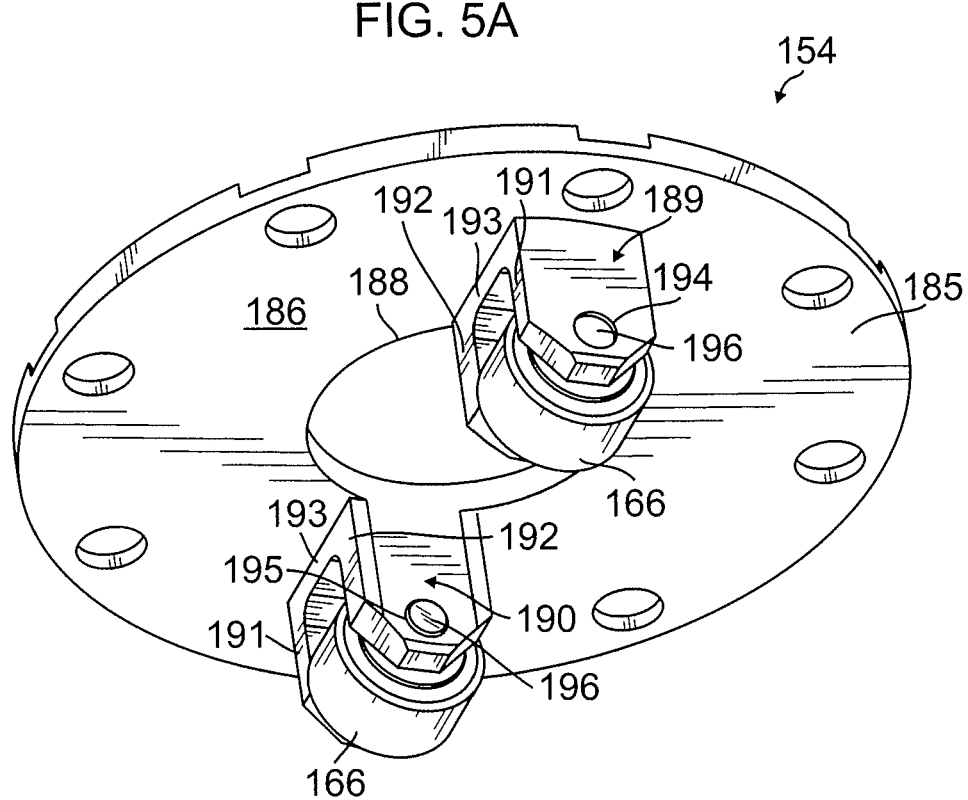
Figure 5C:
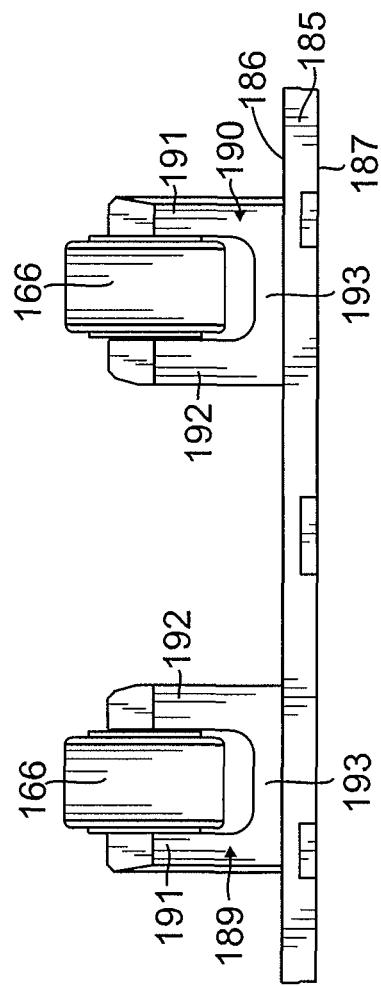
FIGS. 5C and 5D are a top view and a side view, respectively, of the roller assembly illustrated in FIGS. 5A and 5B.
Figure 5D:
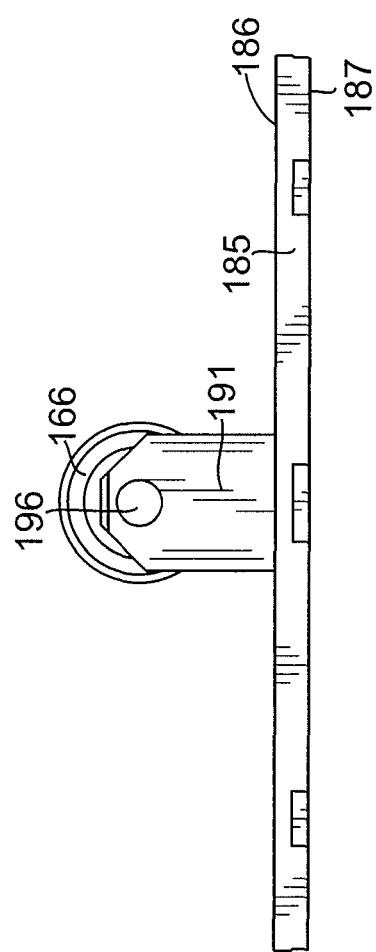

With continued reference to FIGS. 5A-5D, the roller plate assembly 154 also includes two devises 189, 190 coupled to the inner surface 186 of the circular plate 185. The devises 189, 190 may be either integrally formed with the flat, circular plate 185 or separately formed and coupled to the flat, circular plate 185 by any suitable means, such as bonding, welding, mechanical fastening, or combinations thereof. Each clevis 189, 190 includes two closely spaced legs 191, 192 and a bar 193 interconnecting outer ends of the legs 191, 192. The legs 191, 192 of each clevis 189, 190 each also include an opening 194, 195, respectively. Together, the pair of openings 194, 195 in each clevis 189, 190 are configured to support an axle 196. The axle 196 of each clevis 189, 190 is configured to rotatably support a roller 166 (i.e., the rollers 166 are configured to rotate about the axles 196). As illustrated in FIGS. 5A and 5B, the devises 189, 190 are oriented radially around the flat, circular plate 185. In the illustrated embodiment, the roller plate assembly 154 includes two rollers 166, although the roller plate assembly 154 may include any other suitable number of rollers 166, such as, for example, one to four rollers, and still fall within the scope and spirit of the present disclosure. As described in further detail below, the rollers 166 on the roller plate assembly 154 are configured to roll along the cam surface 165 of the cam 156 as the die assembly 151 is moved into and out of alignment with the pipe segment 110.

The roller plate assembly 154 also includes a plurality of openings 197 circumferentially disposed around the flat, circular plate 185. The circumferentially disposed openings 197 in the circular plate 185 are configured to receive a plurality of fasteners 198 coupling the roller plate assembly 154 to the piston body 150, as illustrated in FIGS. 2A and 2B. In the illustrated embodiment, the roller plate assembly 154 also includes a plurality of depressions 199 surrounding the openings 197 and extending inward from the outer surface 187 of the flat, circular plate 185. The plurality of depressions 199 are configured to recess at least a portion of the fasteners 198 coupling the roller plate assembly 154 to the piston body 150.

Figure 6A:
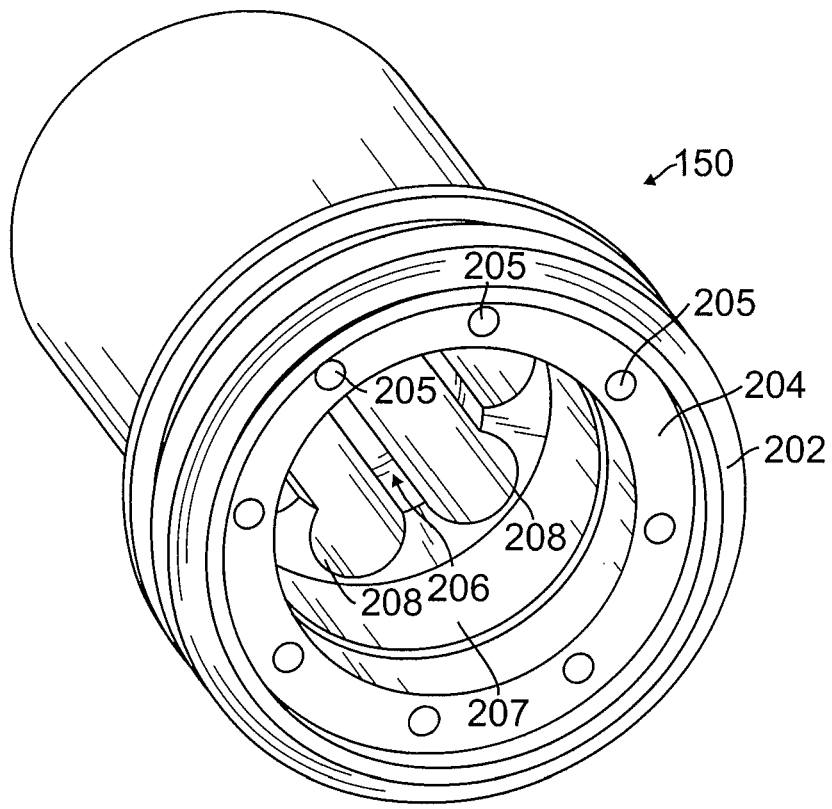
FIGS. 6A and 6B are rear and front perspective views, respectively, of a piston housing according to one embodiment of the present disclosure.
Figure 6C:
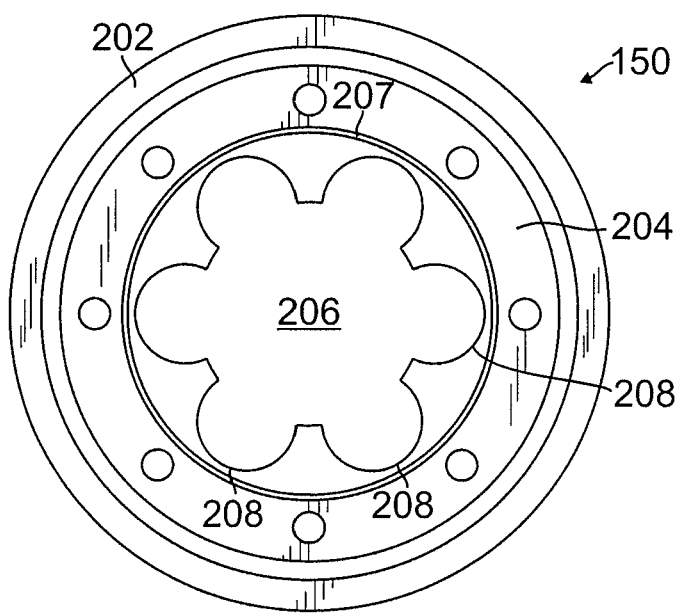
FIG. 6C is an rear plan view of the piston housing illustrated in FIGS. 6A and 6B.
Figure 6B:
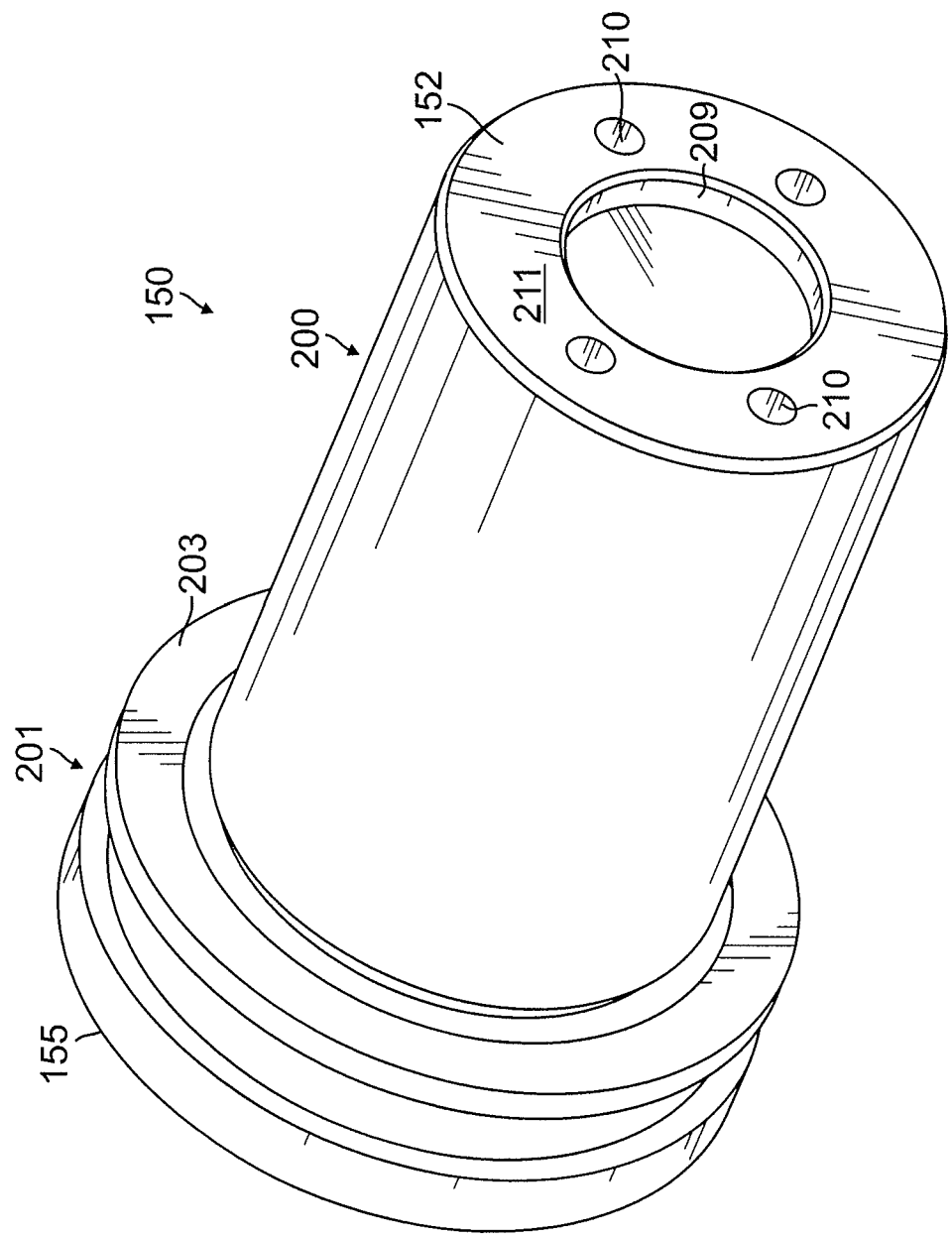

With reference now to the embodiment illustrated in FIGS. 6A-6C, the piston body includes 150 a smaller cylindrical portion 200 and a larger cylindrical portion 201. In the illustrated embodiment, the larger cylindrical portion 201 is located at an outer end of the smaller cylindrical portion 200. The larger cylindrical portion 201 includes an outer surface 202 and an inner surface 203 opposite the outer surface 202. The piston body 150 also includes an annular recess 204 extending inward from the outer surface 202 of the larger cylindrical portion 201. The annular recess 204 is configured to receive the circular plate 185 of the roller plate assembly 154 (i.e., the circular plate 185 is configured to be seated in the annular recess 204). In one embodiment, when the self-aligning piston assembly 122 is assembled, the outer surface 187 of the circular plate 185 of the roller plate assembly 154 is flush with the outer surface 202 of the larger cylindrical portion 201 of the piston body 150. In alternate embodiments, the outer surface 187 of the roller plate assembly 154 may be recessed in the annular recess 204 of the piston body 150 or may protrude outward from the outer surface 202 of the piston body 150. The larger cylindrical portion 201 of the piston body 150 also includes a plurality of openings 205, such as threaded blind bores, extending inward from the annular recess 204 and circumferentially disposed around the annular recess 204. The threaded blind bores 205 are configured to receive the plurality of fasteners 198 securing the roller plate assembly 154 to the piston body 150. Although in the illustrated embodiment the piston body 150 includes eight threaded blind bores 205, the piston body 150 may have any other suitable number of threaded blind bores 205, such as, for example, two to twelve. In an alternate embodiment, the openings 205 in the piston body 150 may be smooth blind bores and the fasteners 198 securing the roller plate assembly 154 to the piston body 150 may be self-tapping fasteners.

With continued reference to FIGS. 6A-6C, the piston body 150 also includes a central axial recess 206 (e.g., a smooth, cylindrical blind bore) configured to receive the splined cylindrical rod portion 137 of the shaft 135. The central axial recess 206 is sized such that the piston body 150 may slide along the cylindrical rod portion 137 of the shaft 135 as the self-aligning piston assemblies 122 are actuated between the engaged position (FIG. 2B) and the disengaged position (FIG. 2A). The depth of the central axial recess 206 in the piston body 150 defines the maximum stroke of the piston body 150 (i.e., the depth of the central axial recess 206 in the piston body 150 defines the extent to which the self-aligning piston assembly 122 can extend inward to engage the pipe segment 110). The piston body 150 also includes a depression 207 (e.g., a smooth blind bore) extending inward from the annular recess 204 in the larger cylindrical portion 201. In the illustrated embodiment, the depression 207 is larger than, and concentric with, the central axial recess 206 in the piston body 150. The depression 207 is configured to house the cam 156 and is sized to enable the cam 156 to slide within the piston body 150 and along the splined cylindrical rod 137 of the shaft 135, the significance of which is described below (i.e., the depth of the depression 207 in the piston body 150 is sized to enable the cam 156 to slide within the piston body 150). The piston body 150 also includes a plurality of smaller arcuate notches 208 extending inward from the depression 207. In the illustrated embodiment, the arcuate notches 208 are circumferentially equidistantly disposed around the central axial recess 206 in the piston body 150, as illustrated in FIG. 6C. The arcuate notches 208 are configured to house and retain the springs 153 in the piston body 150. Although in the illustrated embodiment the piston body 150 includes six arcuate notches 208, the piston body 150 may have any other suitable number of arcuate notches 208, such as, for example, one to ten, depending upon the number of springs 153 housed in the piston body 150.

As illustrated in FIG. 6B, the piston body also includes a cylindrical recess 209 (e.g., a smooth blind bore) and a plurality of openings 210 disposed around the cylindrical recess 209. The cylindrical recess 209 and the plurality of openings 210 extend outward from an inner surface 211 of the smaller cylindrical portion 200 of the piston body 150. The cylindrical recess 209 is configured to receive a portion of the die assembly 151, and the plurality of openings 210 are configured to receive a plurality of fasteners 212 coupling the die assembly 151 to the inner end 152 of the piston body 150. The openings 210 may be either smooth blind bores or threaded blind bores, depending upon the type of fasteners (e.g., self-tapping fasteners) coupling the die assembly 151 to the piston body 150.

With reference now to the embodiment illustrated in FIGS. 7A-7E, the die assembly 151 includes a die carrier 215 and a die insert 216 configured to be supported by the die carrier 215. The die assembly 151 is configured to be coupled to the inner end 152 of the piston body 150 and to engage the pipe segment 110 when the self-aligning piston assembly 122 is in the extended, engaged position (see FIG. 2B). The die carrier 215 includes a generally rectangular body portion 217 having a pair of longer sides 218, 219 extending in a longitudinal direction and a pair of narrower sides 220, 221 extending in a transverse direction. The die carrier 215 also includes a pair of feet 222, 223 extending outward from the longer sides 218, 219, respectively, of the rectangular body portion 217. Each of the feet 222, 223 taper between a thicker, interconnected portion 224 coupled to the body portion 217 and a relatively thinner, free portion 225 opposite the thicker portion 224. In the illustrated embodiment, each of the feet 222, 223 also includes two openings 226, 227 configured to receive the fasteners 212 coupling the die carrier 215 to the inner end 152 of the piston body 150 (i.e., the fasteners 212 coupling the die assembly 151 to the piston body 150 extend through the openings 226, 227 in the die carrier 215 and into the openings 210 in the inner end 152 of the piston body 150). In the illustrated embodiment, the die carrier 215 also includes a spotface 228 around each of the openings 226, 227 such that the fasteners 212 coupling the die carrier assembly 151 to the piston body 150 rest flush against the die carrier 215. The die carrier 215 also includes a cylindrical protrusion 229 extending outward from an outer surface 230 of the rectangular body portion 217. The cylindrical protrusion 229 is configured to be received in the cylindrical recess 209 in the inner end 152 of the piston body 150.

Figure 7A:
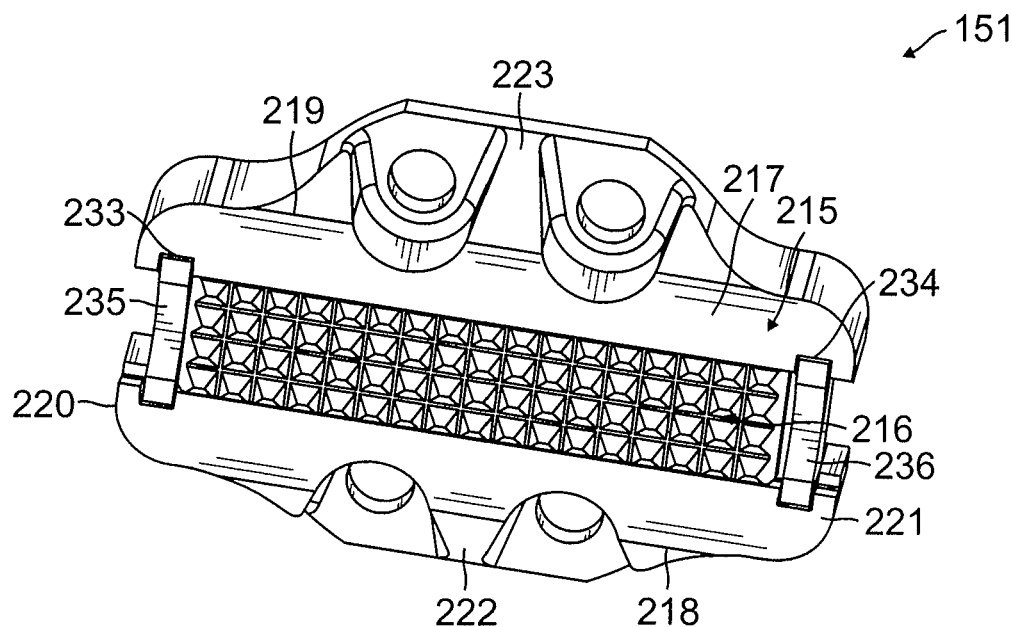
FIGS. 7A and 7B are front and rear perspective views, respectively, of a die assembly according to one embodiment of the present disclosure.
Figure 7B:
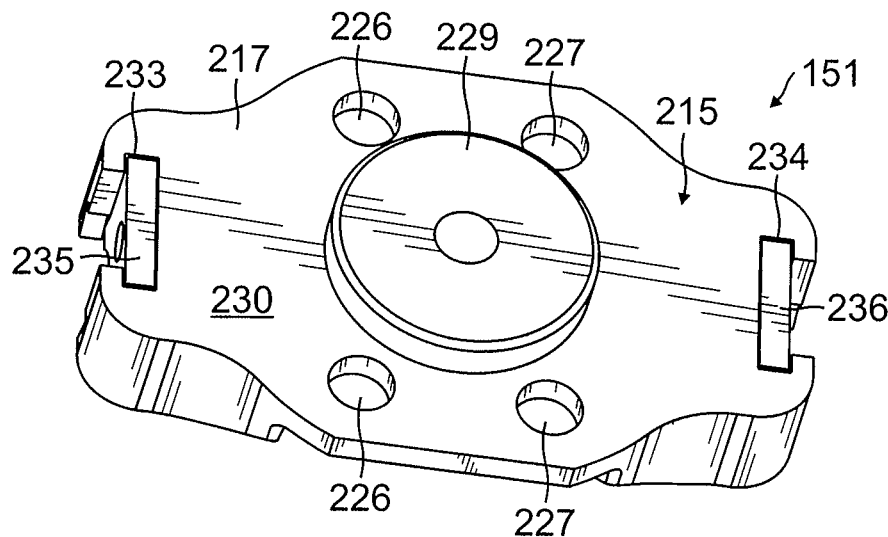
Figure 7C:
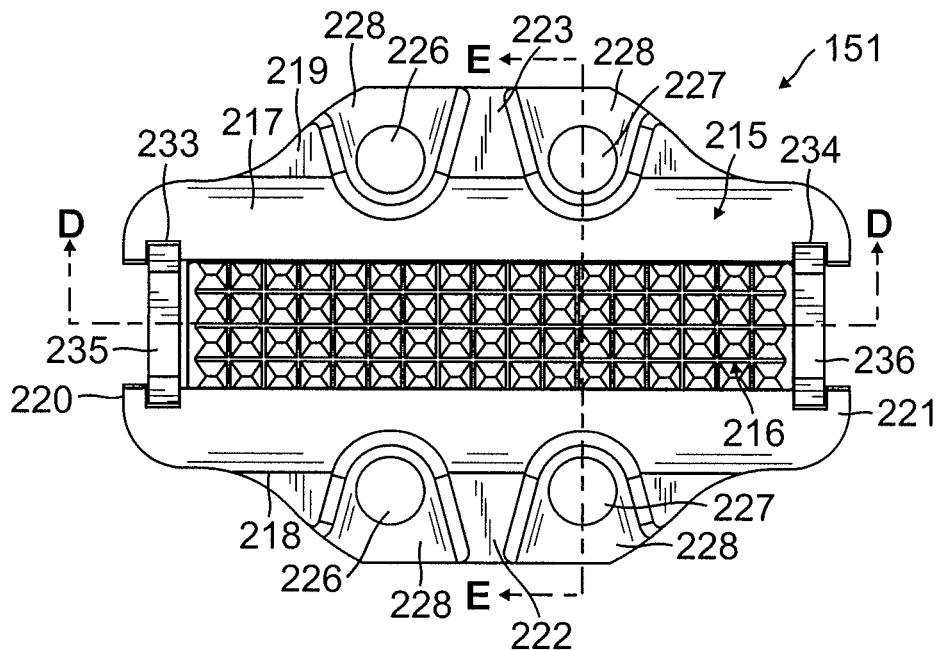
FIG. 7C is a front plan view of the die assembly illustrated in FIGS. 7A and 7B.
Figure 7D:
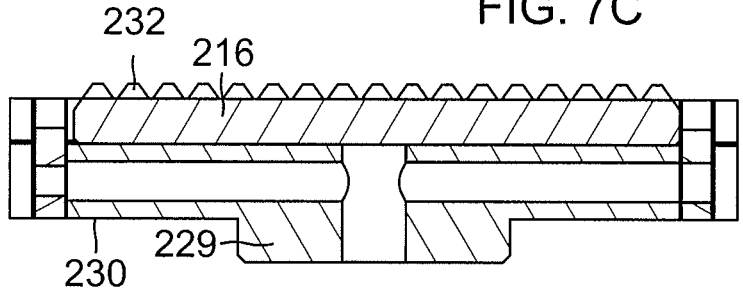
FIGS. 7D and 7E are cross-sectional views of the die assembly illustrated in FIG. 7C taken along lines D-D and E-E, respectively.
Figure 7E:
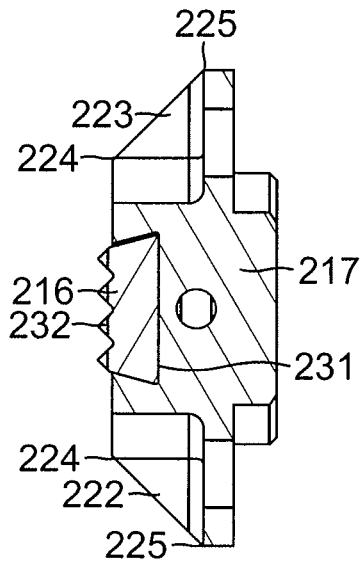

As best illustrated in FIG. 7E, the die carrier 215 also includes a narrow, rectangular channel 231 extending in a longitudinal direction between the narrower sides 220, 221 of the rectangular body portion 217. The narrow channel 231 is configured to slidably receive the die insert 216. In the illustrated embodiment, the die insert 216 is a generally rectangular plate having a friction-inducing inner surface 232, such as, for example, a knurled surface, ridges, etching, striations, a coating, or any combinations thereof. The friction-inducing inner surface 232 of the insert 216 is configured to engage the pipe segment 110 when the self-aligning piston assembly 122 is in the extended, engaged position (FIG. 2B). The die carrier 215 also includes a pair of notches 233, 234 in the narrower sides 220, 221, respectively, of the rectangular body portion 217. The notches 233, 234 are configured to receive end caps 235, 236, respectively, configured to retain the die insert 216 in the narrow channel 231 in the die carrier 215.

Figure 8A:
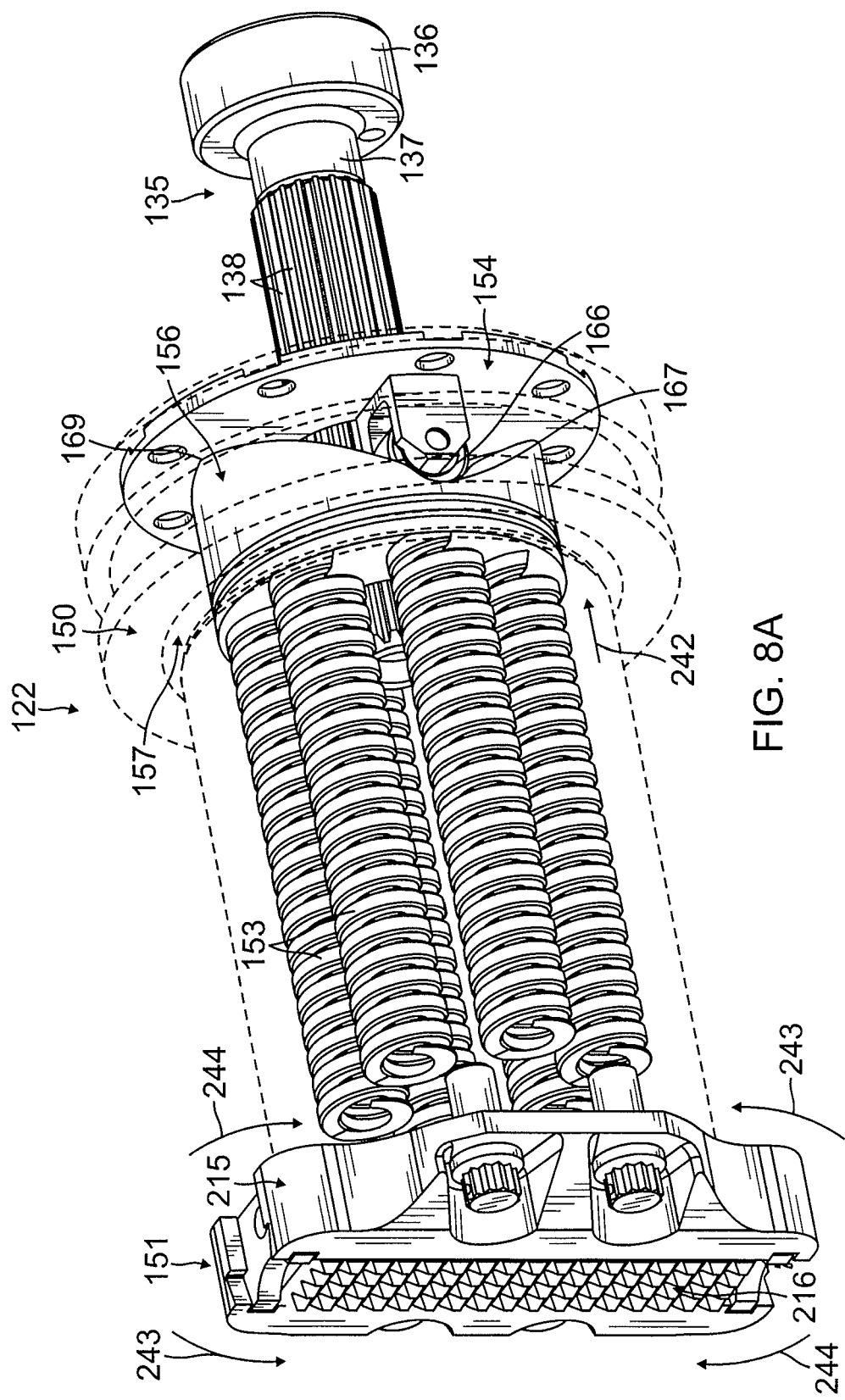
FIGS. 8A and 8B are perspective views of the self-aligning piston assembly according to one embodiment of the present disclosure shown in an aligned orientation and a misaligned orientation, respectively, relative to a pipe segment.
Figure 8B:
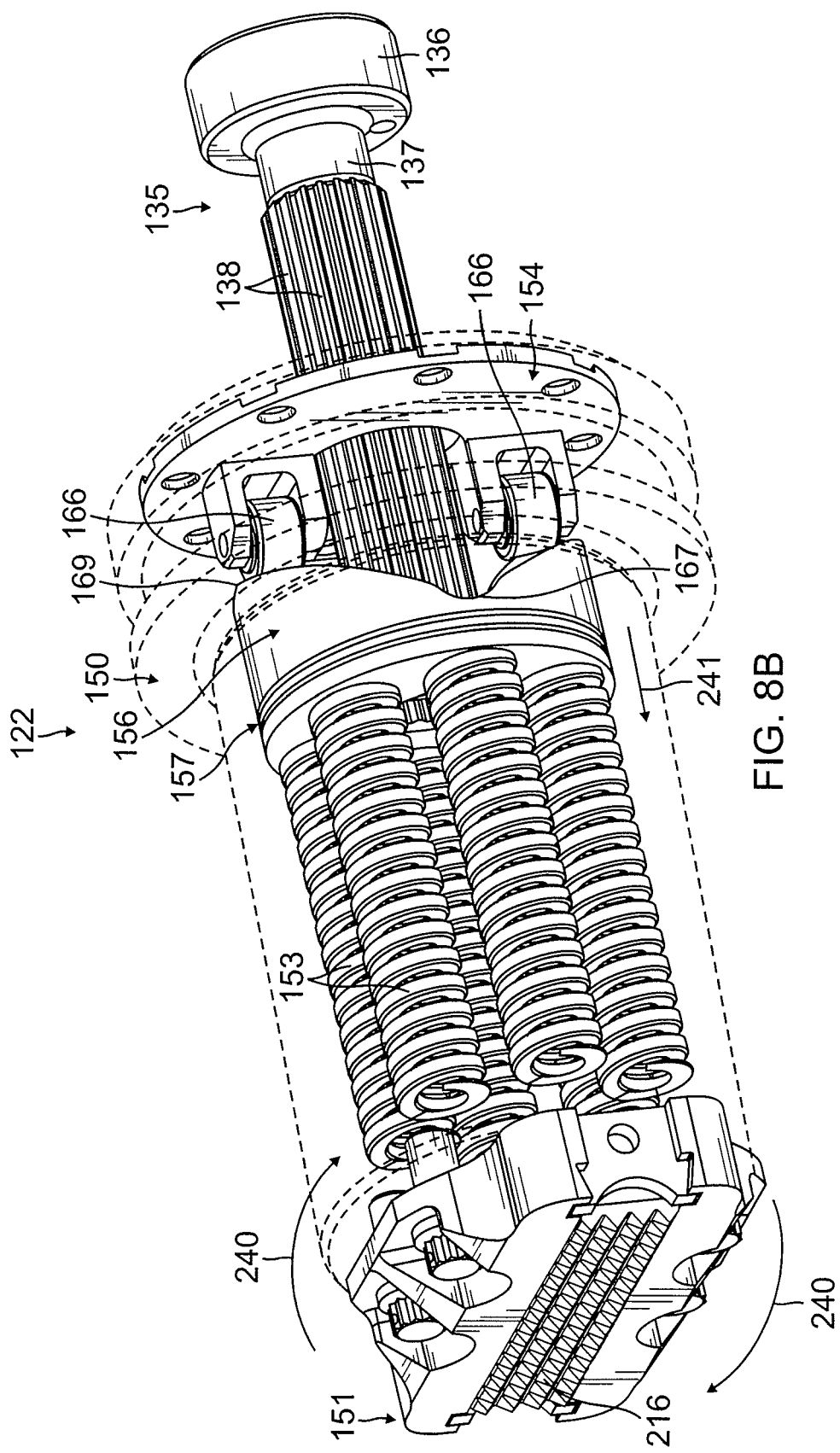
Figure 8C:
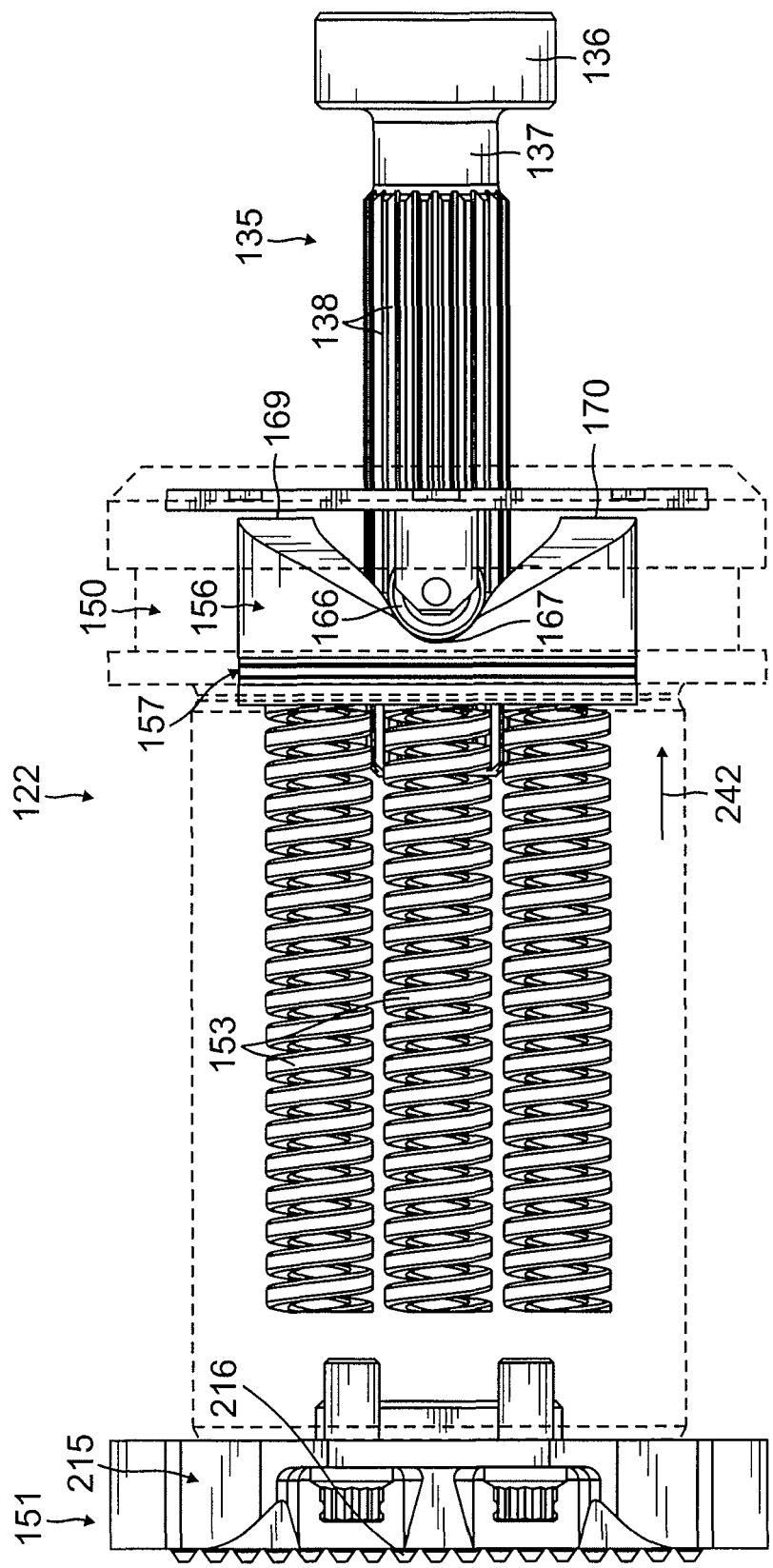
FIGS. 8C and 8D are side views of the self-aligning piston assembly according to one embodiment of the present disclosure shown in an aligned orientation and a misaligned orientation, respectively, relative to a pipe segment.
Figure 8D:
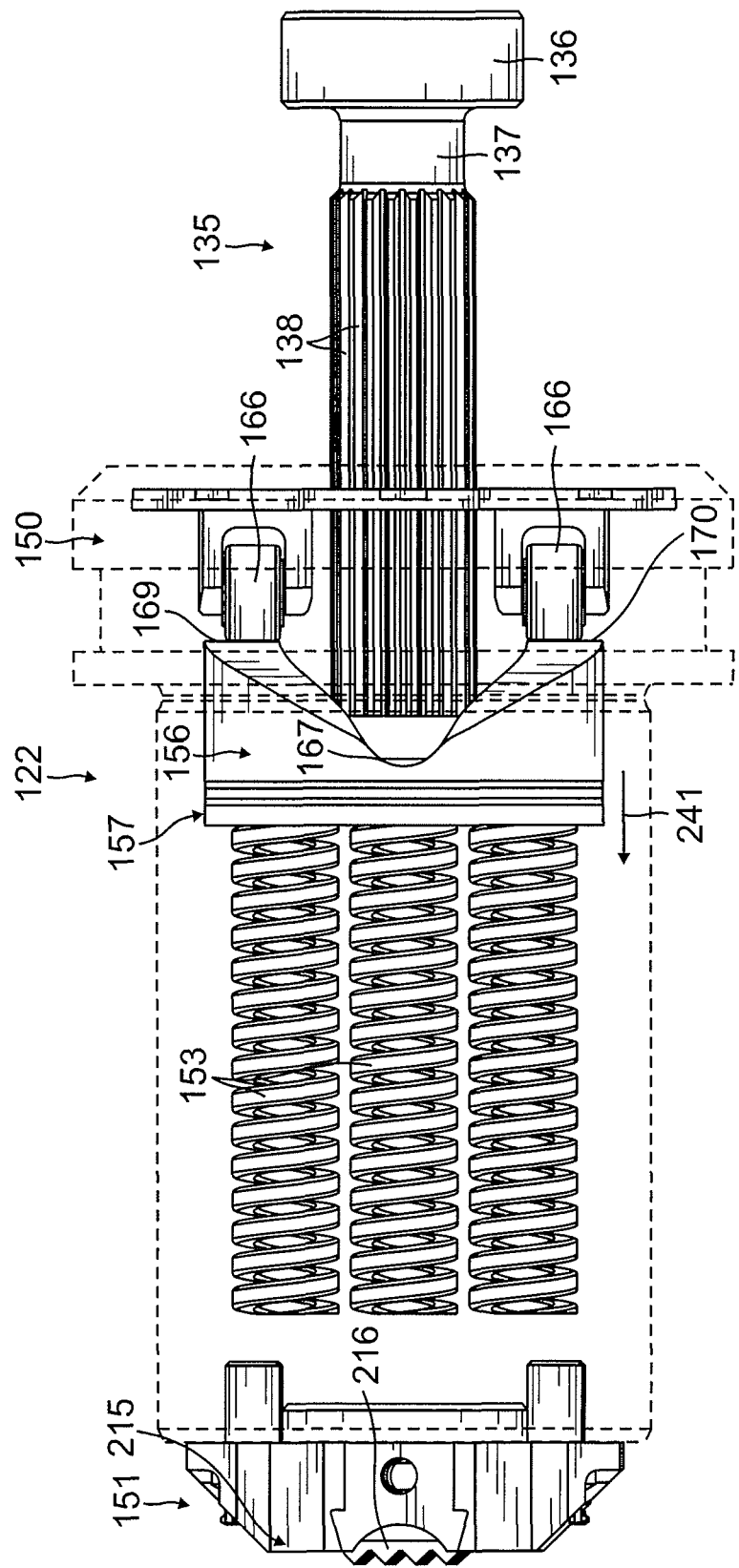

With reference now to FIGS. 8A-8D, the operation of the self-aligning piston assemblies 122 will now be described. Under normal operating conditions, the die assemblies 151 are configured to be oriented vertically (i.e., lengthwise) along the pipe segment 110. Additionally, under normal operating conditions, the rollers 166 on the roller plate assembly 154 are initially seated in the wells 167, 168 of the cam 156, as illustrated in FIGS. 8A and 8C. Accordingly, the positioning of the wells 167, 168 in the cam 156 defines the initial orientation of the die assembly 151 relative to the pipe segment 110. If, however, the die assemblies 151 are rotated (arrow 240 in FIG. 8B) out of alignment with the pipe segment 110 during operation (e.g., due to an off-center load), the rollers 166 are rolled along the cam surface 165 towards the apices 169, 170, as illustrated in FIGS. 8B and 8D (i.e., if the die assemblies 151 are rotated (arrow 240) out of the vertical, aligned orientation relative to the pipe segment 110, the rollers 166 are rolled out of the wells 167, 168 and towards the apices 169, 170 on the cam 156).

As the rollers 166 are rotated towards the apices 169, 170 on the cam 156, the cam 156 is translated inward (arrow 241 in FIG. 8B) along the splined elongated rod 137 of the shaft 135, thereby compressing the springs 153 housed in the piston body 150 (i.e., because the roller plate assembly 154 is fixedly attached to the piston body 150, as the rollers 166 roll up along the sloped segments of the cam surface 165 toward the apices 169, 170 on the cam 156, the cam 156 is forced inward (arrow 241) along the shaft 135 toward the die assembly 151). In one embodiment, the springs 153 are initially in a pre-compressed state and are further compressed into a higher potential energy state as the rollers 166 are rotated towards the apices 169, 170 on the cam 156 and the cam 156 is forced inward (arrow 241) along the shaft 135. The higher potential energy stored in the compressed springs 153 tends to force the rollers 166 to roll back down along the sloped segments of the cam surface 165 and into the wells 167, 168 in the cam 156 (i.e., the force supplied by the compressed springs 153 tends to bias the rollers 166 on the roller plate assembly 154 down into the wells 167, 168 in the cam 156). As the rollers 166 are rolled back into the wells 167, 168 in the cam 156, the cam 156 is translated outward (arrow 242 in FIG. 8A) along the splined elongated rod 137 of the shaft 135 and into its initial position, thereby reducing the compression in the springs 153 (i.e., the springs 153 are returned to their initial state of pre-compression). Accordingly, the springs 153 force the rollers 166 on the roller plate assembly 154 to roll back down into the wells 167, 168 in the cam 156 such that the die assembly 151 returns to a vertically aligned position relative to the pipe segment 110.

If the die assembly 151 is rotated (arrow 240 in FIG. 8B) less than 90 degrees out of alignment with the pipe segment 110, the rollers 166 will not reach the apices 169, 170 on the cam 156, which are radially spaced apart from the wells 167, 168 in the cam 156 by approximately 90 degrees. Accordingly, if the die assembly 151 is rotated (arrow 240 in FIG. 8B) less than 90 degrees, the rollers 166 and the cam 156 will operate to force the die assembly 151 to rotate (arrow 243 in FIG. 8A) back into its initial, vertically aligned orientation relative to the pipe segment 110 (i.e., the rollers 166 will be forced back into the wells 167, 168 in which they were initially seated).

If the die assembly 151 is rotated (arrow 240 in FIG. 8B) between approximately 90 degrees and 270 degrees out alignment with the pipe segment 110, the rollers 166 will roll past the apices 169, 170 in the cam 156. Accordingly, if the die assembly 151 is rotated (arrow 240) between 90 degrees and 270 degrees, the rollers 166, the springs 153, and the cam 156 will operate to force the die assembly 151 to rotate (arrow 244 in FIG. 8A) into a vertical orientation upside-down from its initial orientation (i.e., if the rotation of the die assembly 151 forces the rollers 166 to roll past the apices 169, 170 on the cam 156, the springs 153 will force the rollers 166 to roll down into the wells 167, 168 in the cam 156 opposite from the wells 167, 168 in which they were initially seated, but the die assembly 151 will return to an aligned, vertical orientation relative to the pipe segment 110). Accordingly, the die assembly 151 returns to the aligned vertical orientation by rotating in a counterclockwise direction (arrow 243) when the die assembly 151 is rotated (arrow 240 in FIG. 8B) less than 90 degrees out of alignment with the pipe segment 110 and returns to the aligned vertical orientation by rotating in an clockwise direction (arrow 244) when the die assembly 151 is rotated (arrow 240 in FIG. 8B) between approximately 90 degrees and 270 degrees out alignment with the pipe segment 110. Each incremental rotation of the die assembly 151 up to 180 degrees beyond 270 degrees will alternately force the die assembly 151 into its initial, vertical orientation relative to the pipe segment 110 and a vertical orientation upside-down from its initial orientation. Accordingly, regardless of the degree of rotation of die assembly 151 out of alignment with the pipe segment 110, the die assembly 151 is configured to be automatically returned to an aligned (e.g., vertical) orientation relative to the pipe segment 110 by operation of the springs 153, the cam 156, and the rollers 166. It will be appreciated that the die assembly 151 may be symmetric about a horizontal axis such that the die assembly 151 is configured to properly engage the pipe segment 110 when oriented either right-side-up or upside-down.

The piston body 150, the die assembly 151, the springs 153, the roller assembly 154, the cam 156, and the thrust bearing assembly 157 may be made of any suitable materials, such as, for example, aluminum, steel, alloy, or carbon fiber reinforced plastic. The piston body 150, the die assembly 151, the springs 153, the roller assembly 154, the cam 156, and the thrust bearing assembly 157 may be formed by any suitable process, such as, for example, extruding, machining, stamping, pressing, molding, welding, rapid prototyping using additive manufacturing techniques, or any combination thereof While this invention has been described in detail with particular references to exemplary embodiments thereof, the exemplary embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims. Although relative terms such as "outer," "inner," "upper," "lower," "below," "above," "vertical," "horizontal," and similar terms have been used herein to describe a spatial relationship of one element to another, it is understood that these terms are intended to encompass different orientations of the various elements and components of the invention in addition to the orientation depicted in the figures. Additionally, although the pipe gripping assemblies and self-aligning piston assemblies of the present invention have been described with reference to an oil drilling rig, it will be appreciated that the pipe gripping assemblies and self-aligning piston assemblies may be used in any other suitable application or industry.

What is claimed is:

1. A self-aligning piston configured to selectively engage and disengage a pipe segment, the self-aligning piston comprising:
   a shaft;
   a piston body; and
   a cam and roller assembly coupled between the shaft and the piston body,
   wherein the cam and roller assembly includes a cam and a plurality of rollers, and
   wherein the piston body is configured to slide along the shaft between an engaged position with the pipe segment and a disengaged position, and wherein the piston body is configured to rotate around the shaft between an aligned orientation relative to the pipe segment and a misaligned orientation.

2. The self-aligning piston of claim 1 further comprising a resilient, energy-storing member coupled to the piston body; wherein the resilient, energy-storing member is configured to press the plurality of rollers against the cam.

3. The self-aligning piston of claim 2, wherein the resilient, energy-storing member comprises a plurality of springs.

4. The self-aligning piston of claim 2, wherein the resilient, energy-storing member is in a pre-compressed state when the piston body is in the engaged position.

5. The self-aligning piston of claim 1, wherein the shaft is splined.

6. The self-aligning piston of claim 5, wherein the cam further comprises a hub having a splined surface configured to engage the shaft, the engagement between the hub and the shaft being configured to prevent the rotation of the cam about the shaft.

7. The self-aligning piston of claim 1, wherein:
   the cam defines a contoured cam surface having wells and apices; and
   the plurality of rollers rest in the wells.

8. The self-aligning piston of claim 1, further comprising a die assembly coupled to the piston body.

9. A self-aligning piston assembly configured to selectively engage and disengage a pipe segment, the self-aligning piston assembly comprising:
   a splined shaft; and a piston assembly configured to slide along the splined shaft between an engaged position and a disengaged position, the piston assembly including: a piston housing configured to rotate between an aligned position and a misaligned position relative to the pipe segment; a plurality of springs coupled to the piston housing; a cam defining a cam surface having wells and apices; and a roller assembly, the roller assembly including a plurality of rollers configured to roll along the cam surface, wherein: the plurality of rollers are configured to rest in the wells when the piston housing is in the aligned position; the plurality of rollers are configured to roll along the cam surface toward the apices as the piston housing is rotated into the misaligned position; and the springs are configured to bias the rollers into the wells to return the piston housing to the aligned position.

10. The self-aligning piston assembly of claim 9, wherein the cam further comprises a hub having a splined surface configured to engage the splined shaft, the engagement between the hub and the splined shaft being configured to prevent rotation of the cam about the splined shaft.

11. The self-aligning piston assembly of claim 9, further comprising a die assembly coupled to the piston housing wherein the die assembly comprises: a die holder; and a die insert configured to be supported by the die holder.

12. The self-aligning piston assembly of claim 9, wherein the piston housing comprises a plurality of smooth blind bores configured to receive the plurality of springs.

13. The self-aligning piston assembly of claim 9, further comprising a thrust bearing disposed between the cam and the plurality of springs.

14. A pipe gripping assembly configured to selectively engage and disengage a pipe segment, the pipe gripping assembly including first and second jaws configured to clamp together around the pipe segment, wherein at least one of the first and second jaws comprises:

a splined shaft fixedly housed in the at least one of the first and second jaws; and a self-aligning piston housed in the at least one of the first and second jaws and configured to slide along the splined shaft between an engaged position and a disengaged position and to rotate around the splined shaft between an aligned orientation relative to the pipe segment and a misaligned orientation, wherein the self-aligning pistons includes a piston body, and a cam and roller assembly coupled to the piston body and to the splined shaft, and wherein the cam and roller assembly includes a cam and a plurality of rollers configured to rotate relative to the cam.

15. The pipe gripping assembly of claim 14, wherein the at least one of the first and second jaws further comprises: an extension port configured to receive pressurized hydraulic fluid to actuate the self-aligning piston into the engaged position; and a retraction port configured to receive pressurized hydraulic fluid to actuate the self-aligning piston into the disengaged position.

16. The pipe gripping assembly of claim 14, further comprising a gland fixedly housed in the at least one the first and second jaws, the gland being configured to create a fluid-tight seal around the self-aligning piston.

17. The pipe gripping assembly of claim 14, wherein: the cam defines a contoured cam surface having wells and apices; the plurality of rollers are configured to rest in the wells when the self-aligning piston is in the aligned orientation; the plurality of rollers are configured to roll along the contoured cam surface toward the apices as the self-aligning piston is rotated toward the misaligned orientation; and a resilient, energy-storing member is configured to bias the plurality of rollers into the wells to return the self-aligning piston to the aligned orientation.

18. The pipe gripping assembly of claim 14, wherein the cam further comprises a hub having a splined surface configured to engage the splined shaft, the engagement between the hub and the splined shaft being configured to prevent the rotation of the cam about the splined shaft.

19. The pipe gripping assembly of claim 14, further comprising a die assembly coupled to an inner end of the piston body.

20. The pipe gripping assembly of claim 14, wherein the self-aligning piston further comprises an energy-storing member coupled to the piston body, wherein the energy-storing member is in a pre-compressed state when the self-aligning piston is in the engaged position, and the energy-storing member is compressed further into a higher potential energy state when the self-aligning piston is in the disengaged position.

* * * * *